US012079466B2

(12) United States Patent
Ma

(10) Patent No.: US 12,079,466 B2
(45) Date of Patent: Sep. 3, 2024

(54) DISPLAY APPARATUS AND DISPLAY METHOD

(71) Applicant: HISENSE VISUAL TECHNOLOGY CO., LTD., Shandong (CN)

(72) Inventor: Le Ma, Shandong (CN)

(73) Assignee: HISENSE VISUAL TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 18/348,740

(22) Filed: Jul. 7, 2023

(65) Prior Publication Data
US 2023/0350567 A1 Nov. 2, 2023

Related U.S. Application Data

(63) Continuation of application No. PCT/CN2021/102319, filed on Jun. 25, 2021.

(30) Foreign Application Priority Data

Jan. 18, 2021 (CN) .......................... 202110062747.X
Jan. 18, 2021 (CN) .......................... 202110064697.9
Jan. 18, 2021 (CN) .......................... 202110064704.5

(51) Int. Cl.
G06F 3/04883 (2022.01)
G06F 3/04845 (2022.01)

(52) U.S. Cl.
CPC ...... *G06F 3/04883* (2013.01); *G06F 3/04845* (2013.01)

(58) Field of Classification Search
CPC .............. G06F 21/6245; G06F 3/0482; G06F 2221/2145; H04L 67/10
See application file for complete search history.

(56) References Cited

U.S. PATENT DOCUMENTS

2003/0184525 A1* 10/2003 Tsai .................... G06F 3/04845
345/173
2011/0074828 A1* 3/2011 Capela ................. G06F 3/0481
345/173

FOREIGN PATENT DOCUMENTS

CN 101667089 A 3/2010
CN 101984396 A 3/2011
(Continued)

OTHER PUBLICATIONS

International Search Report, mailed Oct. 22, 2021, from PCT/CN2021/102319 filed Jun. 25, 2021.
(Continued)

*Primary Examiner* — Cao H Nguyen
(74) *Attorney, Agent, or Firm* — ANOVA LAW GROUP, PLLC

(57) ABSTRACT

A display apparatus and method. The at least one processor of the display apparatus is configured to generate a first rotation angle based on a rotation gesture formed by contacting the display with at least two fingers of the user and moving at least one finger, wherein the first rotation angle is a rotation angle of the rotation gesture; draw a rotated image according to the first rotation angle, so as to cause the first rotation angle to associate with a second rotation angle of the rotated image, wherein at least two opposite vertices of the rotated image are always within a display range of the display, the rotated image does not exceed the display range of the display, and the second rotation angle is a rotation angle of the rotated image; and control the display to present the rotated image.

16 Claims, 14 Drawing Sheets

(56) References Cited

FOREIGN PATENT DOCUMENTS

| | | | |
|---|---|---|---|
| CN | 101989145 A | 3/2011 |
| CN | 102073405 A | 5/2011 |
| CN | 102169383 A | 8/2011 |
| CN | 102479065 A | 5/2012 |
| CN | 103279290 A | 9/2013 |
| CN | 103823625 A | 5/2014 |
| CN | 104317491 A | 1/2015 |
| CN | 104777998 A | 7/2015 |
| CN | 104881263 A | 9/2015 |
| CN | 105573631 A | 5/2016 |
| CN | 106648378 A | 5/2017 |
| CN | 107479808 A | 12/2017 |
| CN | 107710135 A | 2/2018 |
| CN | 108304116 A | 7/2018 |
| CN | 109242976 A | 1/2019 |
| CN | 109901778 A | 6/2019 |
| CN | 109976623 A | 7/2019 |
| CN | 110221722 A | 9/2019 |
| CN | 201910447629 | * 9/2019 |
| CN | 111309232 A | 6/2020 |
| CN | 111787388 A | 10/2020 |
| CN | 111913608 A | 11/2020 |
| CN | 111970550 A | 11/2020 |
| CN | 112650418 A | 4/2021 |
| CN | 112732120 A | 4/2021 |
| CN | 112947783 A | 6/2021 |

OTHER PUBLICATIONS

Chinese Office Action, mailed Jul. 21, 2022, from China Pat. App. No. 202110064697.9, filed Jan. 18, 2021.

Chinese Office Action, mailed Jun. 10, 2022, from China Pat. App. No. 202110064704.5, filed Jan. 18, 2021.

Chinese Office Action, mailed Jun. 2, 2022, from China Pat. App. No. 202110062747.X, filed Jan. 18, 2021.

* cited by examiner

DISPLAY APPARATUS AND DISPLAY METHOD

This application is a continuation application of PCT PCT/CN2021/102319 which claims the priorities from Chinese Patent Application No. 202110062747.X filed on Jan. 18, 2021, Chinese Patent Application No. 202110064704.5 filed on Jan. 18, 2021, and Chinese Patent Application No. 202110064697.9 filed on Jan. 18, 2021, which are hereby incorporated by reference in their entireties.

FIELD OF INVENTION

The disclosure relates to the field of image display technology, and in particular to a display apparatus and method.

BACKGROUND

At present, since the display apparatuses can provide users with playback images such as audio, video, image, etc., users pay a lot of attention to them. With the developments of big data and artificial intelligence, the users' demands for functions of display apparatuses are increasing day by day. For example, the user wishes to directly interact with the display apparatus without using a remote processor to interact with the display apparatus.

The touch screen display apparatus came into being, and the display of the touch screen display apparatus is a touch screen display (Touch Screen), which allows the user to operate the host computer by gently touching the image or text on the display with his/her finger, thus getting rid of keyboard, mouse and remote control operation, and making the human-computer interaction more straightforward.

It is a basic function of the touch screen display apparatus that the user controls the rotation of the image shown on the display by rotating the finger touching on the display. The current interaction method is as follows: after multiple fingers rotate on the screen, the image immediately rotates to a horizontal or vertical angle according to the rotation direction of the fingers. There is no interaction process, causing poor user experience.

BRIEF SUMMARY

The disclosure provides some display apparatuses and methods.

A first aspect of the embodiments of the disclosure shows a display apparatus, including: a display, configured to display an image and/or user interface; a touch component, configured to detect a touch track input from a user; a memory, configured to store data associated with the display and computer instructions; at least one processor in connection with the display, the touch component and the memory and configured to execute the computer instructions to cause the display apparatus to: generate a first rotation angle based on a rotation gesture formed by contacting the display with at least two fingers of the user and moving at least one finger, wherein the first rotation angle is a rotation angle of the rotation gesture; draw a rotated image according to the first rotation angle, so as to cause the first rotation angle to associate with a second rotation angle of the rotated image, wherein at least two opposite vertices of the rotated image are always within a display range of the display, the rotated image does not exceed the display range of the display, and the second rotation angle is a rotation angle of the rotated image; and control the display to present the rotated image.

A second aspect of the embodiments of the disclosure shows a display method for a display apparatus, including: generating a first rotation angle based on a rotation gesture formed by contacting the display with at least two fingers of the user and moving at least one finger, wherein the first rotation angle is a rotation angle of the rotation gesture; drawing a rotated image according to the first rotation angle, so as to cause the first rotation angle to associate with a second rotation angle of the rotated image, wherein at least two opposite vertices of the rotated image are always within a display range of the display, the rotated image does not exceed the display range of the display, and the second rotation angle is a rotation angle of the rotated image; and controlling the display to present the rotated image.

DETAILED DESCRIPTION OF THE EMBODIMENTS

In order to make the purposes and embodiments of the disclosure clearer, the exemplary embodiments of the disclosure will be described clearly and completely below in combination with the accompanying drawings in the exemplary embodiments of the disclosure. Obviously, the described exemplary embodiments are some embodiments of the disclosure but not all the embodiments.

It should be noted that the brief description of the terms in the disclosure is only for the convenience of understanding the embodiments described hereafter, and is not intended to limit the embodiments of the disclosure. Unless otherwise specified, these terms should be understood according to the plain and ordinary meanings.

The terms "first", "second", "third" and the like in the specification and claims as well as the above drawings in the disclosure are used to distinguish similar objects or entities, but not necessarily meant to limit a particular order or sequence, unless otherwise indicated. It should be understood that the terms so used are interchangeable under appropriate circumstances.

Figure 1:
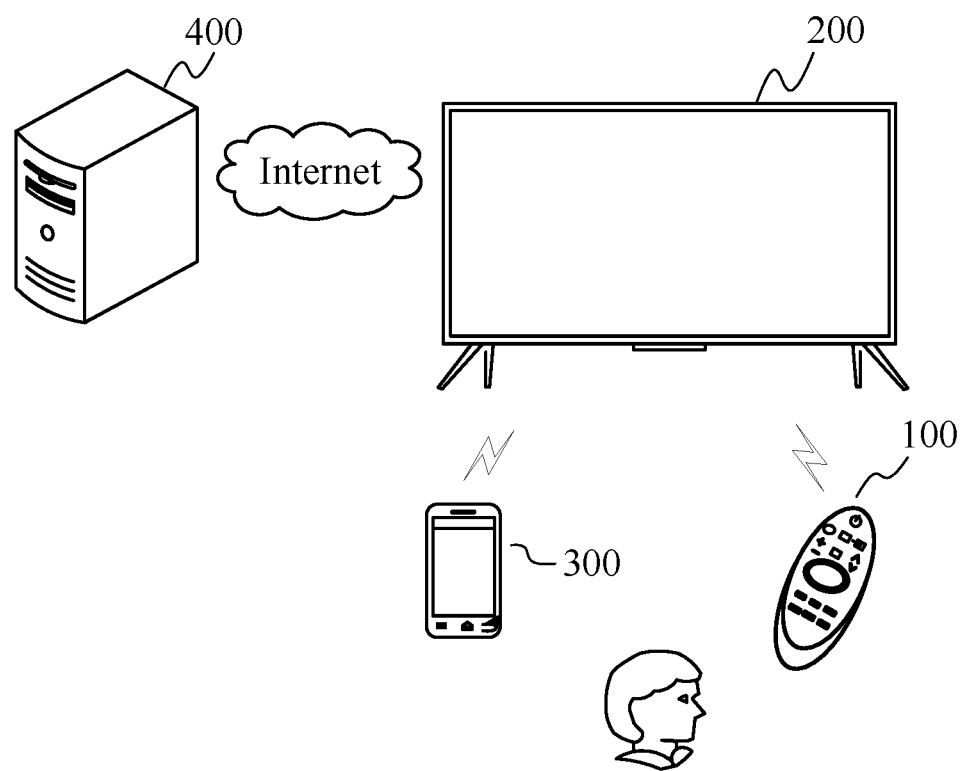
FIG. 1 illustrates a schematic diagram of an operation scenario between a display apparatus and a control device according to some embodiments.

FIG. 1 is a schematic diagram of an operation scenario between a display apparatus and a control device according to embodiments. As shown in FIG. 1, a user can operate the display apparatus 200 through the smart terminal 300 or the control device 100.

The control device 100 may be a remote control, and the communication between the remote control and the display apparatus includes infrared protocol communication or Bluetooth protocol communication and other short-range communication methods. The display apparatus 200 is controlled wirelessly or wiredly. The user may input user commands through the keys on the remote controller, voice inputs, control panel inputs, etc. to control the display apparatus 200.

In some embodiments, the smart terminal 300 (e.g., a mobile terminal, a tablet computer, a computer, a notebook computer, etc.) may also be used to control the display apparatus 200. For example, an application running on the smart device is used to control the display apparatus 200.

In some embodiments, the display apparatus 200 may also be controlled in a manner other than the control device 100 and the smart device 300. For example, the user's voice command control may be directly received by a module for acquiring voice commands configured inside the display apparatus 200, or the user's voice command may be received by a voice device provided outside the display apparatus 200.

In some embodiments, the display apparatus 200 also communicates data with the server 400. The display apparatus 200 may have communication connection through a Local Area Network (LAN), a Wireless Local Area Network (WLAN), and other networks. The server 400 may provide various contents and interactions to the display apparatus 200.

Figure 2:
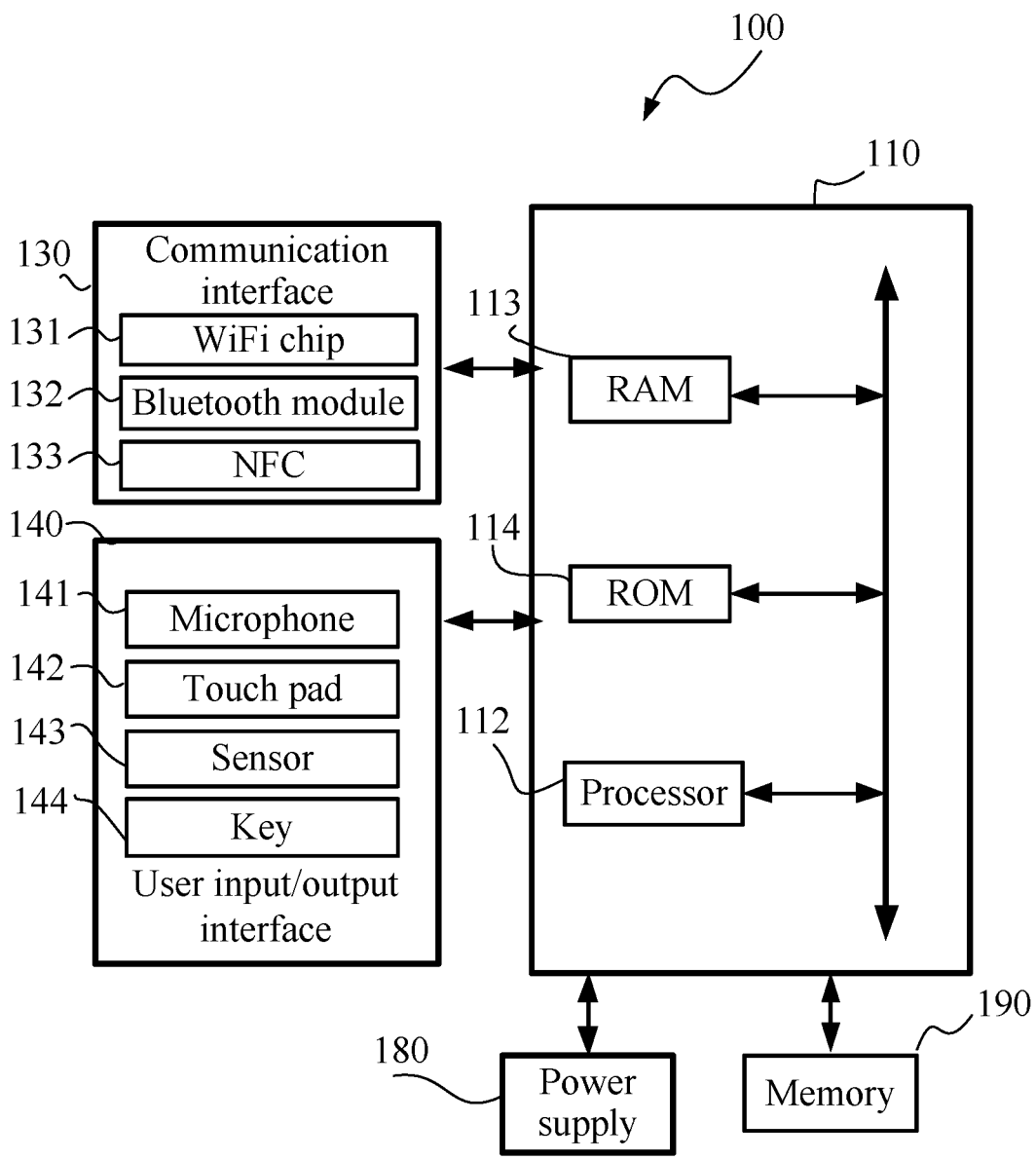
FIG. 2 illustrates a block diagram of the hardware configuration of the display apparatus 200 according to some embodiments.

FIG. 2 illustrates a configuration block diagram of the control device 100 according to an exemplary embodiment. As shown in FIG. 2, the control device 100 includes at least one processor 110, a communication interface 130, a user input/output interface 140, a memory, and a power supply. The control device 100 may receive an operation command from a user and convert the operation command into an instruction that can be recognized and responded by the display apparatus 200, and play an intermediary role between the user and the display apparatus 200.

Figure 3:
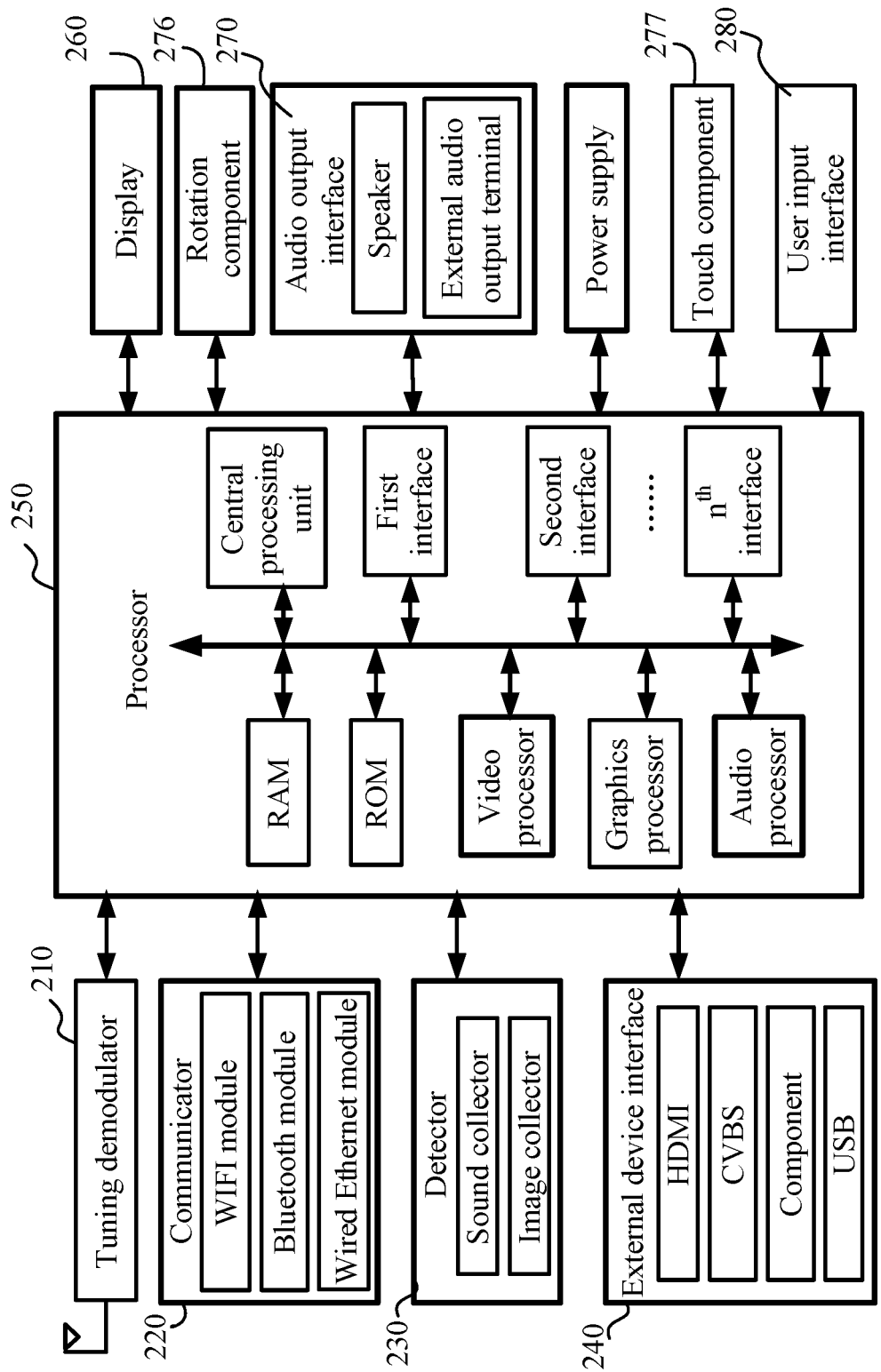
FIG. 3 illustrates a block diagram of the hardware configuration of the control device 100 according to some embodiments.

FIG. 3 shows a block diagram of the hardware configuration of the display apparatus 200 according to an exemplary embodiment.

The display apparatus 200 includes some of a tuning demodulator 210, a communicator 220, a detector 230, an external device interface 240, at least one processor 250, a display 260, an audio output interface 270, a memory, a power supply, or a user interface.

The display 260 includes: a panel component for presenting an image, a driver component for driving the image display, a component for receiving an image signal output from the at least one processor to display the video content and image content as well as a menu control interface, and a user interface for user's operation.

The display 260 may be a liquid crystal display, an OLED display or a projection display, and may also be some projection devices and projection screens.

The communicator 220 is a component for communicating with an external device or server according to various types of communication protocols. For example, the communicator may include at least some of a Wifi module, a Bluetooth module, a wired Ethernet module, other network communication protocol chip or near-field communication protocol chip, or an infrared receiver. The display apparatus 200 may establish the transmission and reception of control signals and data signals with the external control device 100 or the server 400 through the communicator 220.

The user interface may be used to receive a control signal from the control device 100 (e.g., an infrared remote control, etc.).

The detector 230 is used to collect signals from external environment or signals for interaction with outside. For example, the detector 230 includes a light receiver, which is a sensor for collecting the intensity of the ambient light; or the detector 230 includes an image collector, such as a camera, which may be used to collect external environment scenes, user attributes or user interaction gestures; or the detector 230 includes a sound collector, such as a microphone, which is used to receive external sounds.

The external device interface 240 may include, but is not limited to, any one or more of a High-Definition Multimedia Interface (HDMI), an analog or data high-definition component input interface (Component), a Composite Video Broadcast Signal (CVBS) input interface, a USB input interface (USB), or an RGB port. The external device interface 240 may also be a composite input/output interface formed by a plurality of interfaces described above.

In some exemplary implementations, when the display apparatus is also equipped with the horizontal and vertical rotation presentation function, the display apparatus further includes a rotation component for driving the display to rotate. For example, the rotation component 276 may include a drive motor, a rotation shaft and the like, where the drive motor can be connected with the at least one processor 250, and output a rotation angle under the control of the at least one processor 250; one end of the rotation shaft is connected with the power output shaft of the drive motor, and the other end of the rotation shaft is connected with the display 260, so that the display 260 can be fixedly installed on the wall or bracket by the rotation component 276.

The rotation component 276 may also include other parts, such as a transmission part, a detection part and the like, where the transmission part can adjust the rotation speed and torque output by the rotation component 276 through a specific transmission ratio, which may be the gear transmission mode; and the detection part may comprise sensors (such as angle sensor, attitude sensor, etc.) arranged on the rotating shaft. These sensors can detect parameters such as the rotation angle of the rotation component 276 and send the detected parameters to the at least one processor 250, so that the at least one processor 250 can determine or adjust the state of the display apparatus 200 according to the detected parameters. In practical applications, the rotation component 276 may include but not limited to one or more of the above parts.

In some exemplary implementations, when the user wants to input a command by touching the display, the display apparatus further includes a touch component 277 (not shown in the figures). For example, the display apparatus 200 can support a touch interaction function by adding the touch component 277. Generally, the touch component 277 can form a touch screen together with the display 260. On the touch screen, the user can input different commands through touch operations. For example, the user may input touch commands such as click, slide, long press, and double click, and different touch commands may represent different functions.

In order to realize the above-mentioned different touch actions, the touch component 277 can generate different electrical signals when the user inputs different touch actions, and send the generated electrical signals to the at least one processor 250. The at least one processor 250 may perform the feature extraction from the received electrical signal, so as to determine a control function to be executed by the user according to the extracted feature.

For example, when the user inputs a click touch action on the position of any application icon in an interface of the application, the touch component 277 will sense the touch action and generate an electrical signal. After the at least one processor 250 receives the electrical signal, the at least one processor 250 can firstly determine the duration of the level of the electrical signal, corresponding to the touch action, and recognize that the user input is a click touch command when the duration is less than the preset time threshold. The at least one processor 250 then extracts the position feature generated by the electrical signal, so as to determine the touch position. When the touch position is within the display range of an icon of the application, it is determined that the user has input the click touch command at the position of the icon of the application. Correspondingly, the click touch command is used to launch the corresponding application, so the at least one processor 250 can start and run the corresponding application.

For another example, when the user inputs a sliding action in the media resource display page, the touch component 277 also sends the sensed electrical signal to the at least one processor 250. The at least one processor 250 firstly determines the duration of the signal corresponding to the touch action in the electrical signal, and then determines the change of the position where the signal is generated when determining that the duration is greater than the preset time threshold. Obviously, for the interactive touch action, the generation position of the signal will change, thereby determining that the user has input a sliding touch command. The at least one processor 250 then determines the sliding direction of the sliding touch command according to the change of the position where the signal is generated, and controls to turn the display image in the media resource display page to display more media resource options. Further, the at least one processor 250 may also extract features such as the sliding speed and the sliding distance of the sliding touch command, and perform page-turning function according to the extracted features, so as to achieve the effect of following hand operation of the user.

Similarly, for touch commands such as double click and long press, the at least one processor 250 can extract different features and determine the type of the touch command through feature determination, and then execute the corresponding function according to the preset interaction rule. In some embodiments, the touch component 277 also supports the multi-point touch, so that the user can input the touch action with multiple fingers on the touch screen, such as multi-finger click, multi-finger long press, multi-finger slide, etc.

The above-mentioned touch actions can also cooperate with specific applications to realize specific functions. For example, when the user opens the application "demonstration whiteboard", the display 260 can present a drawing area in which the user can draw a specific touch motion track through a sliding touch command. The at least one processor 250 determines a touch action pattern through the touch action detected by the touch component 277, and controls the display 260 to display in real time, to meet the demonstration effect.

The at least one processor 250 and the tuning demodulator 210 may be located in different separate devices, that is, the tuning demodulator 210 may also be located in an external device (such as an external set-top box, etc.) of the main device where the at least one processor 250 is located.

The at least one processor 250 controls the operations of the display apparatus and responds to the user's operations through various software programs stored in the memory. The at least one processor 250 controls the overall operation of the display apparatus 200. For example, in response to receiving a user command for selecting a UI object shown on the display 260, the at least one processor 250 may perform the operations related to the object selected by the user command.

The object may be any one of selectable objects, e.g., hyperlink, icon or other control. The operations related to the selected object include: an operation for displaying the connection to the hyperlink page, document, image or the like, or an operation for launching the program corresponding to the icon.

In some embodiments, the user may input a user command on the Graphical User Interface (GUI) presented on the display 260, and the user input interface receives a user input command through the Graphical User Interface (GUI). Alternatively, the user may input a user command by inputting the particular sound or gesture, and the user input interface recognizes the sound or gesture through the sensor to receive the user input command.

The kernel, shell and file system together form a basic operating system structure, and allow users to manage files, run programs and use the system. After power-on, the kernel starts, activates the kernel space, abstracts hardware, initializes hardware parameters or others, and runs and maintains the virtual memory, scheduler, signals and Inter-Process Communication (IPC). After the kernel starts, the shell and the user applications are loaded. The applications are compiled into machine codes after startup, to form a process.

The display apparatus is a product that is based on the Internet application technology, has an open operating system and chip, possesses an open application platform, is able to realize two-way human-computer interaction function, and integrate various functions such as audio and video, entertainment and data to meet the diversified and personalized demands of users.

The display of the touch screen display apparatus is a touch screen, which allows the user to operate the host computer by gently touching the display with his or her finger, thus without using keyboard, mouse and remote control operation, and making the human-computer interaction more straightforward.

The display apparatus with the touch function generally supports the rotation of the displayed image. For example, in the applications related to electronic whiteboard, painting and image browsing, the user can input a command for image rotation, for example, the relative rotation of at least two fingers, to thereby rotate the image by a certain angle.

Here, the angle at which the at least two fingers can initially touch the touch component is an initial state, which has an initial angle relative to the fixed position displayed.

The initial angle is an angle between the connecting line between two fingers before the user's fingers rotate and the preset reference line; and the calculation process of the initial angle will be described below with reference to specific examples.

For the convenience of description, two fingers are distinguished, one of which is called an axis finger, which is taken as the axis of rotating in the finger rotation process; and the other finger is called a rotating finger, which rotates around the axis finger in the finger rotation process. Usually the user's thumb is called the axis finger.

In some embodiments, the preset reference line may be a line parallel to the width of the display; and in some embodiments, the preset reference line may be a line parallel to the height of the display. In this embodiment, the line parallel to the width of the display is used as the preset reference line for illustration.

Figure 4:
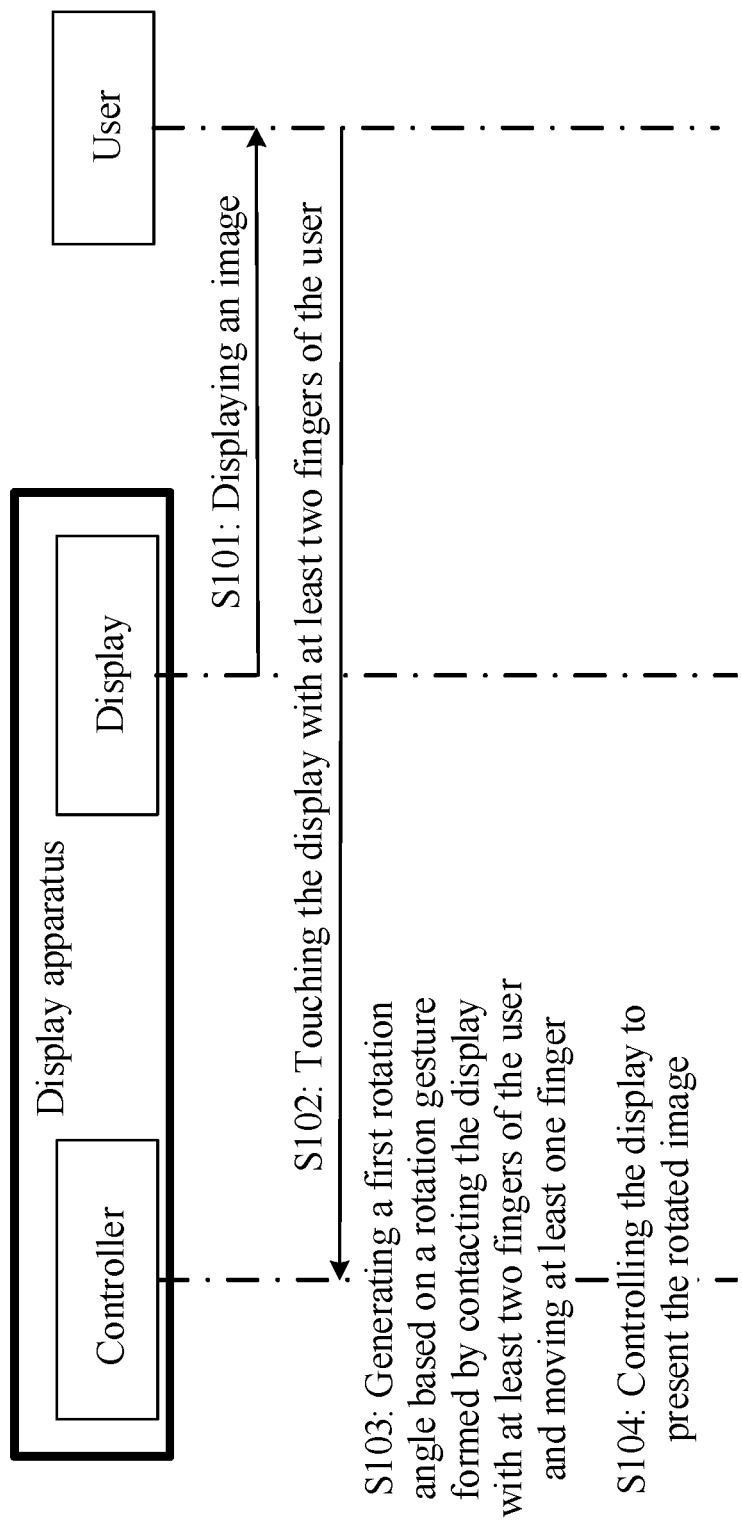
FIG. 4 is a flowchart showing the interaction between the display apparatus and a user according to some embodiments.

FIG. 4 is a flowchart showing the interaction between the display apparatus and a user according to some embodiments.

The display is configured to display an image (S101).

The embodiments do not limit the type of the image. For example, the image may be a photo stored in the display apparatus or a frame image of a video in some embodiments. In some embodiments, the image user opens the home page of the applications.

Touching the display with at least two fingers (S102).

When the user needs to rotate the image displayed on the display, the user's finger will touch the display.

Generating a first rotation angle based on a rotation gesture formed by contacting the display with at least two fingers of the user and moving at least one finger (S103).

There are many ways to generate the first rotation angle.

Figure 5:
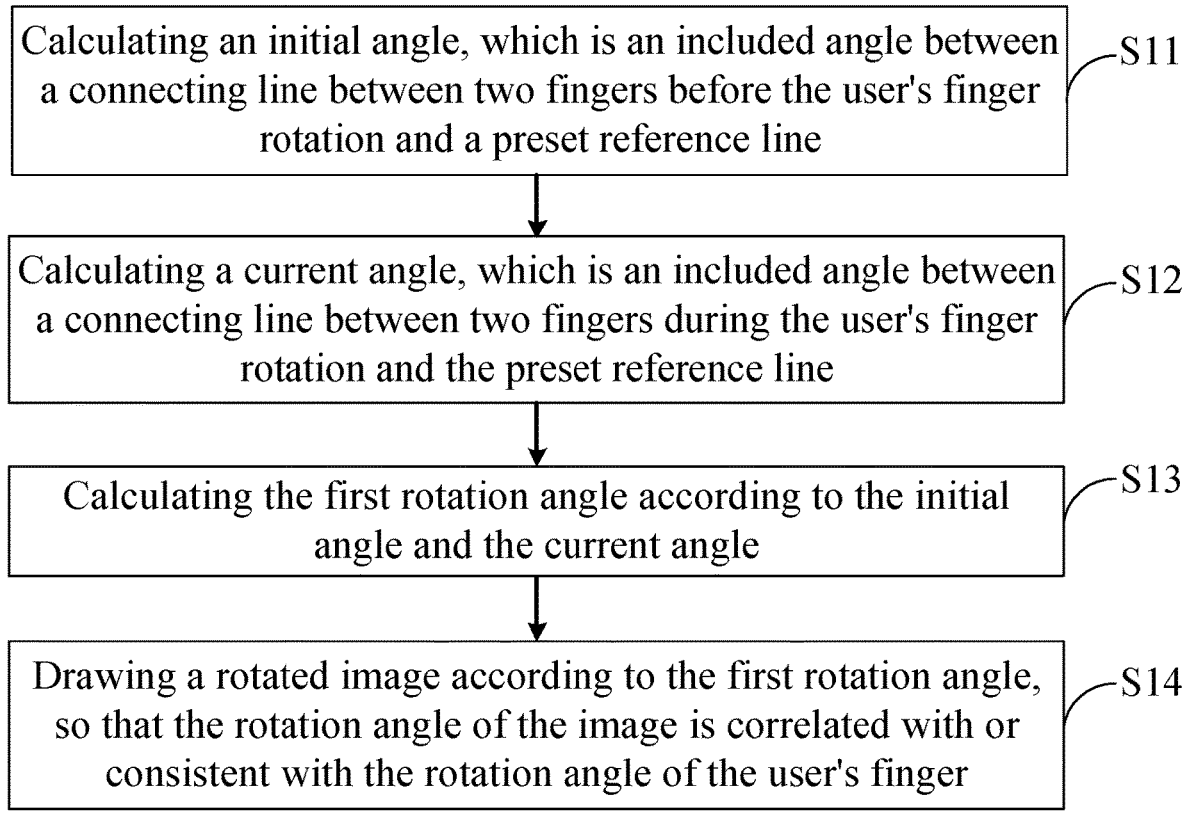
FIG. 5 is a flowchart showing a calculation method of the first rotation angle according to some embodiments.

For example, FIG. 5 is a flowchart showing a calculation method of the first rotation angle according to some embodiments. In response to touching the display with at least two fingers of the user, the at least one processor is configured to perform calculating an initial angle(S11), which is an included angle between a connecting line between two fingers before the user's finger rotation and a preset reference line.

In the embodiments of the disclosure, two fingers of the user simultaneously touch the display as the trigger condition for image rotation. When the user touches the display with each finger, the display will send information of one touch point to the at least one processor, where the information of the touch point is at least the position where the user touches the display. When the user needs to control the rotation of the image, the user usually touches the display with two fingers within the preset time. If the time interval of the two fingers of the user touching the display is long, the user may touch the display by mistake. In order to prevent the above situation, in the embodiments of the disclosure, the at least one processor starts to calculate the initial angle only when the at least one processor receives information of two touch points within the preset time, where the preset time can be set according to requirements.

For example, the preset time may be 5 s in some embodiments. When receiving information of the first touch point, the at least one processor starts the timer. When the time recorded by the timer is 3 s, the at least one processor receives information of the second touch point. In this case, the at least one processor calculates the initial angle according to the information of the first touch point and the information of the second touch point.

In some embodiments, the preset time may be 5 s. When receiving the information of the first touch point, the at least one processor starts the timer. When the time recorded by the timer is 30 s, the at least one processor receives the information of the second touch point. In this case, the initial angle is not calculated.

In some embodiments, the at least one processor does not continue to receive information of the touch point when receiving information of two touch points. For example, when receiving the information of the first touch point, the at least one processor starts the timer. When the time recorded by the timer is 3 s, the at least one processor receives the information of the second touch point, and in this case, the at least one processor turns off the timer. After the timer is off, the at least one processor ignores the subsequently received information of the touch point.

Figure 6:
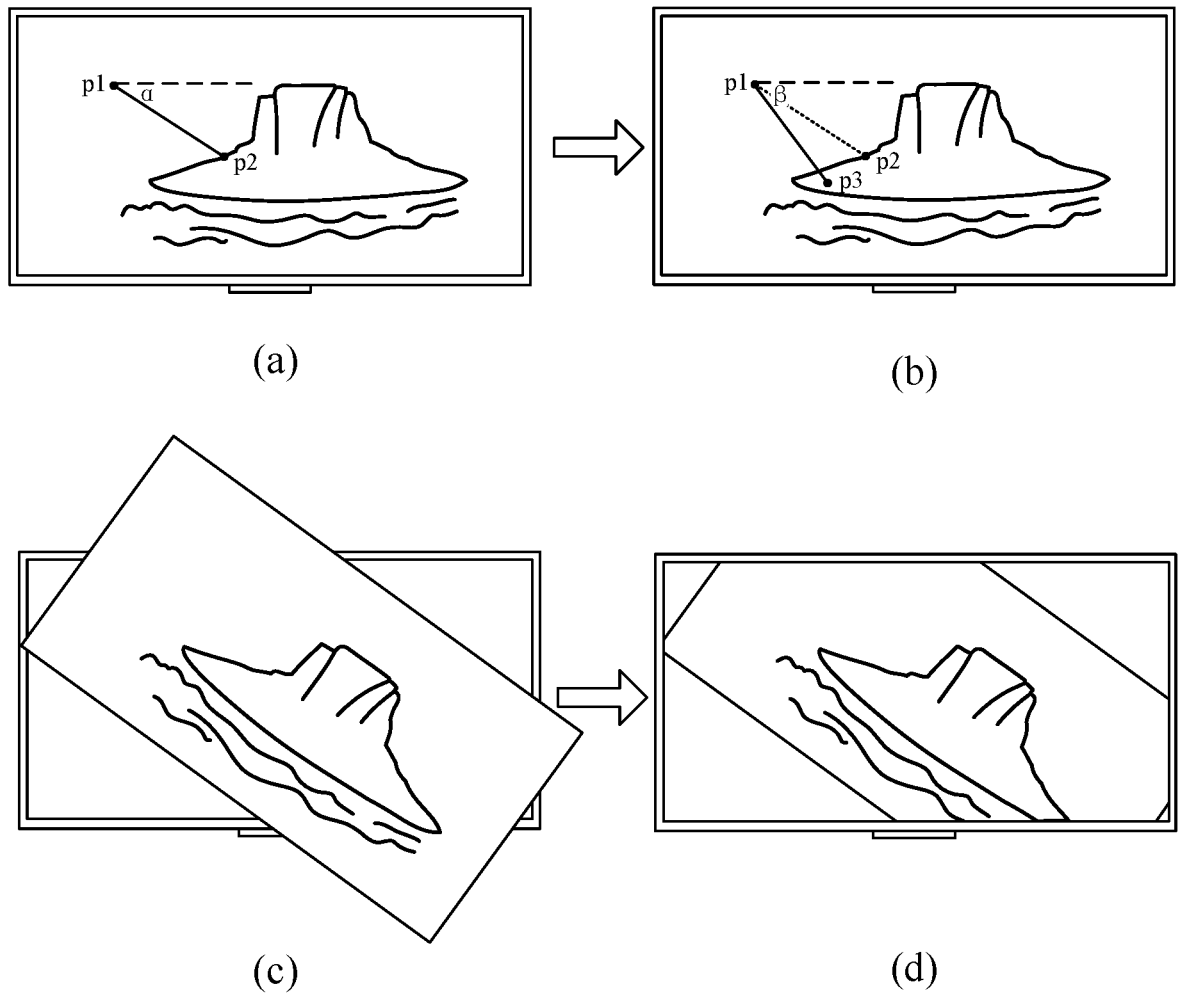
FIG. 6 is a schematic diagram showing a presentation interface of the display during image rotation according to some embodiments.

FIG. 6 is a schematic diagram showing a presentation interface of the display during image rotation according to some embodiments. In the initial state, the display presents a landscape image. The user needs to rotate the image, and the user touches the display with the thumb and index finger simultaneously. The details can refer to the schematic diagram (a) in FIG. 6, where the position touched by the thumb (which may be called an axis finger) is P1, and the position touched by the index finger (which may be called a rotating finger) is P2. The display sends the information (X1, Y1) of the touch point P1 and the information (X2, Y2) of the touch point P2 to the at least one processor. The at least one processor calculates the initial angle based on the information(X1, Y1) of the touch point of P1 and the information (X2, Y2) of the touch point of P2. The preset reference line is a line parallel to the width of the display, where one end (X1, Y1) of the preset reference line coincides with P1, and the other end, namely (X1, Y2), of the preset reference line has the same vertical coordinate as P2 and the same horizontal coordinate as P1.

Finally, the initial angle obtained=$\alpha=(Y2-Y1)/[(Y2-Y1)^2+(X2-X1)^2]^{1/2}$.

It is worth noting that this embodiment is to exemplarily discuss a calculation method of the initial angle. In the process of actual application, the calculation method of the initial angle may be but is not limited to the above method.

In response to the finger rotation, calculating a current angle (S12), which is an included angle between a connecting line between two fingers during the user's finger rotation and the preset reference line.

There are many ways to detect whether the finger rotates. For example, in some embodiments, the display may send the displacement of movement of the rotating finger per unit time to the at least one processor. The at least one processor determines whether the finger rotates through the displacement of movement of the rotating finger per unit time. In the process of actual application, the at least one processor may determine whether the user's finger moves in other ways.

The calculation process of the current angle will be described below in combination with the middle schematic diagram (b) of FIG. 6. The user takes the axis finger as the central axis (the corresponding touch point is P1), and rotates the finger around the axis finger. In this case, the presentation interface of the display can refer to the middle schematic diagram (b) in FIG. 6. The display sends the information (X1, Y1) of the touch point of P1 and the information (X3, Y3) of the touch point of P3 to the at least one processor. In this embodiment, the preset reference line is a line parallel to the width of the display, where one end (X1, Y1) of the preset reference line coincides with P1, and the other end, namely (X1, Y3), of the preset reference line has the same vertical coordinate as P3 and the same horizontal coordinate as P1.

Finally, the current angle obtained=$\beta=(Y3-X1)/[(Y3-Y1)^2+(X3-X1)^2]^{1/2}$.

Calculating the first rotation angle according to the initial angle and the current angle (S13).

The first rotation angle is equal to the difference between the current angle and the initial angle.

Specifically, the first rotation angle=$\beta-\alpha$.

Drawing a rotated image according to the first rotation angle, so that the rotation angle of the image is correlated with or consistent with the rotation angle of the user's finger (S14).

There are many ways to draw the rotated image according to the first rotation angle.

For example, in some embodiments, the at least one processor is provided with an OSD (On-Screen Display) layer; and the OSD layer is configured to control the image rotation according to the first rotation angle to obtain the rotated image, and directly output the rotated image to the display, so that the display presents the rotated image.

The image rotation process can refer to the schematic diagrams (c) and (d) in FIG. 6. Specifically, the OSD layer controls the image rotation according to the first rotation angle to obtain the rotated image can refer to the schematic diagram (c) in FIG. 6, and the effect diagram finally shown on the display can refer to the schematic diagram (d) in FIG. 6.

For example, in some embodiments, the at least one processor is provided with a video layer; and the video layer is configured to render the rotated image based on the image data and the first rotation angle. The video layer cannot control the display to present the image rotation. Therefore, every time the user controls the image rotation, the video layer needs to render the rotated image based on the image data and the first rotation angle.

Figure 7:
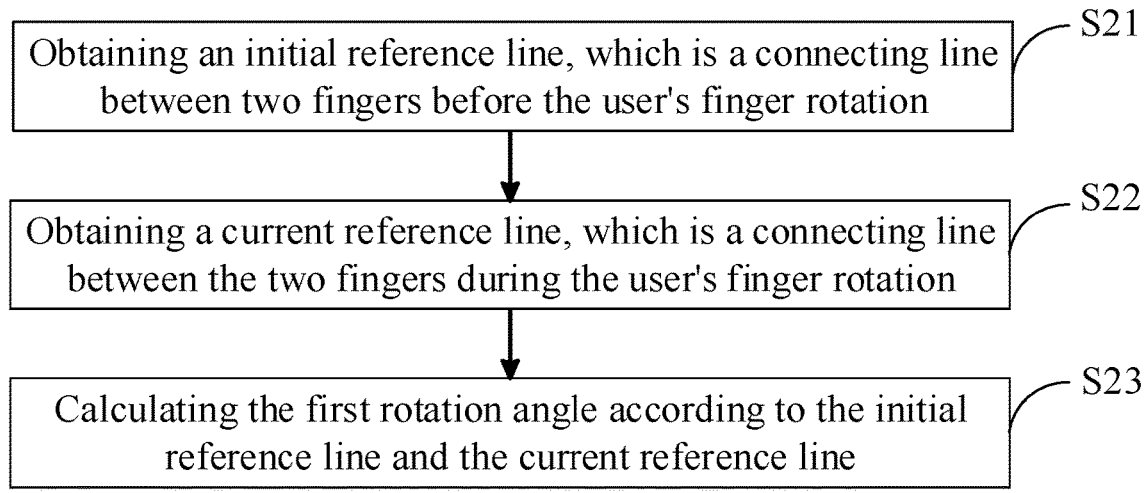
FIG. 7 is a flowchart showing a calculation method of the first rotation angle according to some embodiments.

For example, FIG. 7 is a flowchart showing a calculation method of the first rotation angle according to some embodiments.

While the display is presenting an image, in response to touching the display with at least two fingers of the user, obtaining an initial reference line, which is a connecting line between two fingers before the user's finger rotation (S21).

In response to the finger rotation, obtaining a current reference line, which is a connecting line between the two fingers during the user's finger rotation (S22).

Calculating the first rotation angle according to the initial reference line and the current reference line (S23).

For embodiments about how to calculate the first rotation angle, reference may be made to the above-mentioned embodiments.

Controlling the display to present the rotated image, so as to cause the first rotation angle to associate with a second rotation angle of the rotated image, where the second rotation angle is a rotation angle of the rotated image (S104).

The final effect diagram of the rotated image can refer to the schematic diagram (d) in FIG. 6.

Usually, when the user controls the rotation of the image, the user's finger may rotate clockwise or counterclockwise. In order to match the rotation direction of the image with the rotation direction of the user's finger, in the embodiments of the disclosure, the at least one processor is further configured to generate a rotation identifier to enable the at least one processor to determine the rotation direction of the image according to the rotation identifier, so that the rotation direction of the image matches with the rotation direction of the user's finger, thereby improving the user's experience.

Figure 8:
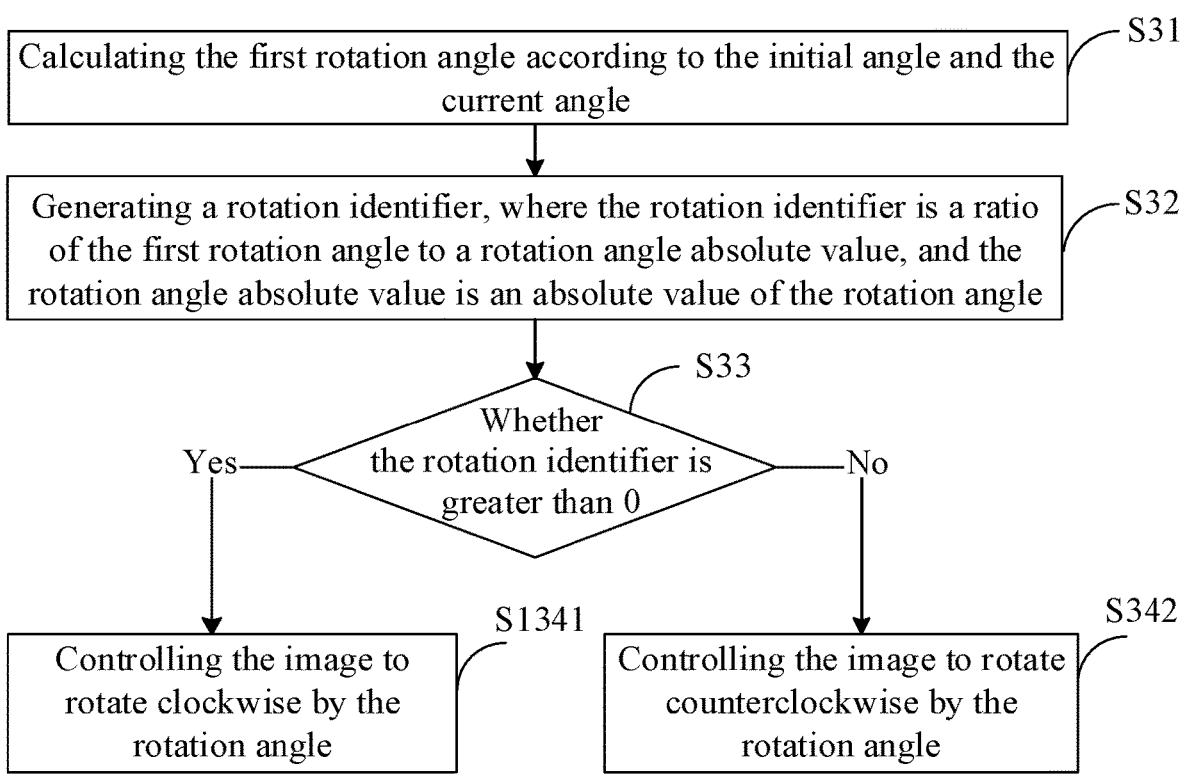
FIG. 8 is a flowchart showing the process in which the at least one processor controls the image rotation according to some embodiments.

FIG. 8 is a flowchart showing the process where the at least one processor controls the image rotation according to some embodiments. It can be seen from the figure that the at least one processor is further configured to execute steps S31-S341/S342.

Step S31: calculating the first rotation angle according to the initial angle and the current angle.

For how to calculate the first rotation angle according to the initial angle and the current angle, reference may be made to the above-mentioned embodiments.

Step S32: generating a rotation identifier, where the rotation identifier is a ratio of the first rotation angle to a rotation angle absolute value, and the rotation angle absolute value is an absolute value of the rotation angle.

There are many ways to generate the rotation identifier. For example, in some embodiments, the rotation angle absolute value may be calculated, and the rotation identifier may be generated according to a ratio of the rotation angle to the rotation angle absolute value.

For example, in some embodiments, the initial angle $\alpha$=60 degrees, the current angle $\beta$=20 degrees, the first rotation angle is calculated as $\beta-\alpha$=20−60=−40 degrees, the absolute value of the first rotation angle is equal to 40 degrees, and the rotation identifier=−40/40=−1.

In some embodiments, the initial angle $\alpha$=60 degrees, the current angle $\beta$=90 degrees, the first rotation angle is calculated as $\beta-\alpha$=90−60=30 degrees, the absolute value of the first rotation angle is equal to 30 degrees, and the rotation identifier=30/30=1.

For another example, in some embodiments, the rotation angle absolute value may be calculated, and the rotation identifier may be generated according to a difference between the first rotation angle and the rotation angle absolute value.

For example, in some embodiments, the initial angle α=60 degrees, the current angle β=20 degrees, the first rotation angle is calculated as β−α=20−60=−40 degrees, the absolute value of the first rotation angle is equal to 40 degrees, and the rotation identifier=−40−40=−80.

In some embodiments, the initial angle α=60 degrees, the current angle β=90 degrees, the first rotation angle is calculated as β−α=90−60=30 degrees, the absolute value of the first rotation angle is equal to 30 degrees, and the rotation identifier=30−30=0.

S33: determining whether the rotation identifier is greater than or equal to 0.

If the rotation identifier is greater than or equal to 0, controlling the image to rotate clockwise by the rotation angle is performed (S341).

If the rotation identifier is less than 0, controlling the image to rotate counterclockwise by the rotation angle is performed (S342).

The rotation process of the image will be further described below in combination with specific examples.

Figure 9A:
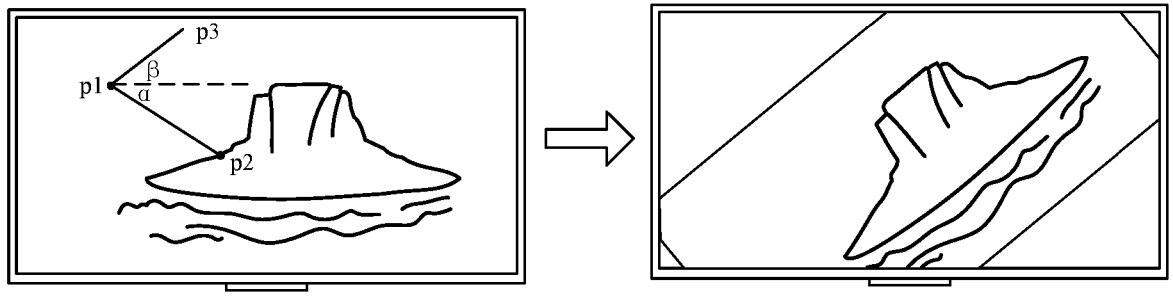
FIG. 9A is a schematic diagram showing a presentation interface of the display during image rotation according to some embodiments.

FIG. 9A is a schematic diagram showing a presentation interface of the display during image rotation according to some embodiments. In this embodiment, the initial angle α=30 degrees, and the current angle α=−30 degrees. The at least one processor calculates the rotation angle as −60 degrees, the absolute value of the rotation angle is equal to 60 degrees, the rotation identifier=−60/60=−1 (less than 0), and the at least one processor controls the image to rotate counterclockwise by 60 degrees.

Figure 9B:
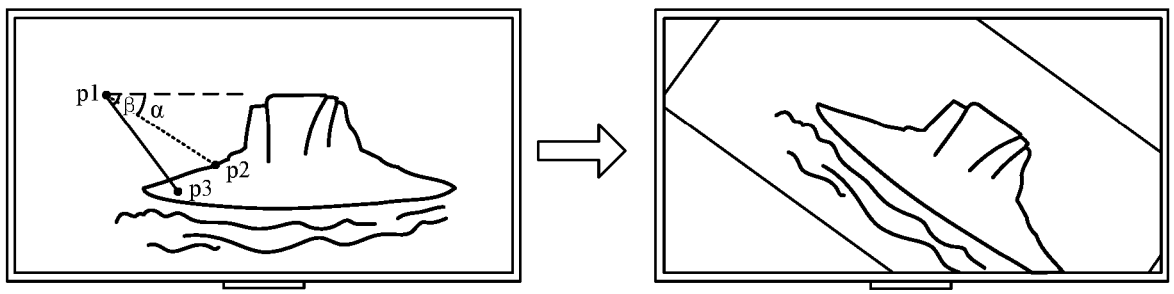
FIG. 9B is a schematic diagram showing a presentation interface of the display during image rotation according to some embodiments.

FIG. 9B is a schematic diagram showing a presentation interface of the display during image rotation according to some embodiments. In this embodiment, the initial angle α=30 degrees, the current angle β=60 degrees, the at least one processor calculates the rotation angle as 30 degrees, the absolute value of the rotation angle is equal to 30 degrees, the rotation identifier=30/30=1 (greater than 0), and the at least one processor controls the image to rotate clockwise by 30 degrees.

In this embodiment, the at least one processor can determine the rotation identifier according to the first rotation angle, and then determine whether to control the image to rotate clockwise or counterclockwise based on the rotation identifier, so that the rotation direction of the image matches with the rotation direction of the user's finger, and the user experience is better.

When the user stops rotating the image, the user will input a rotation gesture to control the image to stop rotating. In this embodiment, the rotation gesture to stop rotating is that the user releases finger touch from the display. In this case, the number of fingers touching the display is less than two. The embodiments of the disclosure further limits a display state of the image in the scenario where the user touches the display with less than two fingers, so as to further improve user experience.

Figure 10:
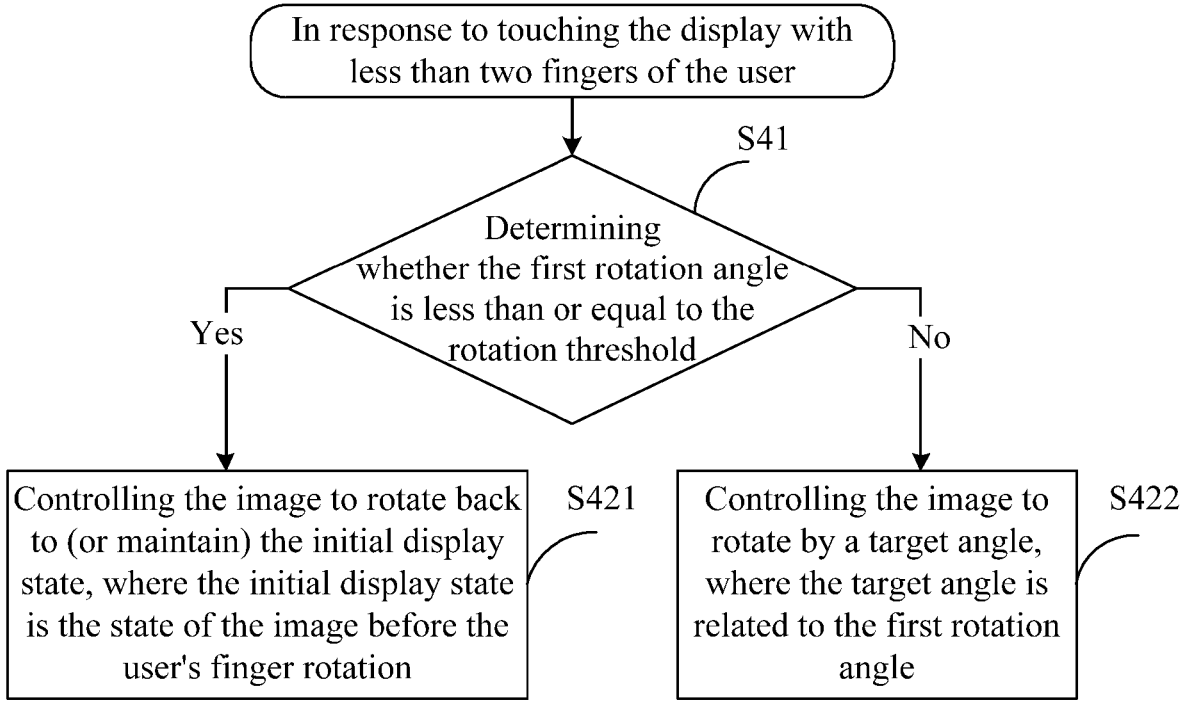
FIG. 10 is a flowchart of controlling the image rotation in an application scenario where the user touches the display with less than two fingers according to some embodiments.

FIG. 10 is a flowchart of controlling the image rotation in a scenario where the user touches the display with less than two fingers according to some embodiments. It can be seen from the figure that the at least one processor is further configured to execute steps S41-S421/S422.

In response to touching the display with less than two fingers of the user, determining whether the first rotation angle is less than or equal to the rotation threshold is performed (S41).

In this embodiment, the rotation threshold may be set according to requirements. For example, in some embodiments, the rotation threshold may be 20 degrees. In some embodiments, the rotation threshold may be 45 degrees.

If the first rotation angle is less than or equal to the rotation threshold, controlling the image to rotate back to (or maintain) the initial display state is performed (step S421), where the initial display state is the state of the image before the user's finger rotation.

Figure 11:
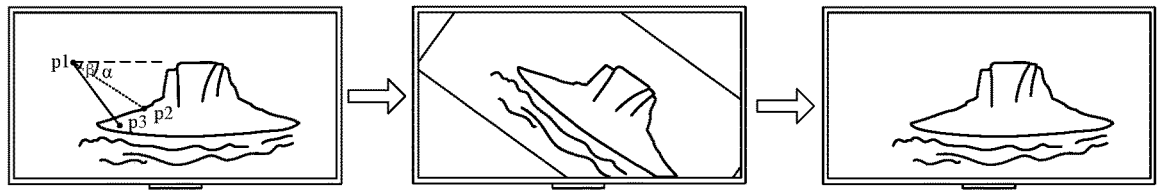
FIG. 11 is a schematic diagram showing a presentation interface of the display during image rotation according to some embodiments.

The rotation process of the image will be further described below in combination with specific examples. FIG. 11 is a schematic diagram showing a presentation interface of the display during image rotation according to some embodiments. In this embodiment, the initial angle α=30 degrees, and the current angle β=60 degrees. The at least one processor calculates the first rotation angle as 30 degrees, and the at least one processor controls the image to rotate clockwise by 30 degrees. In this embodiment, the rotation threshold is 45 degrees (the first rotation angle is less than or equal to the rotation threshold), and the image is controlled to rotate back to (or maintain) the initial state in response to touching the display with less than two fingers of the user.

If the first rotation angle is greater than the rotation threshold, controlling the image to rotate by a target angle is performed (step S422), where the target angle is related to the first rotation angle.

Figure 12:
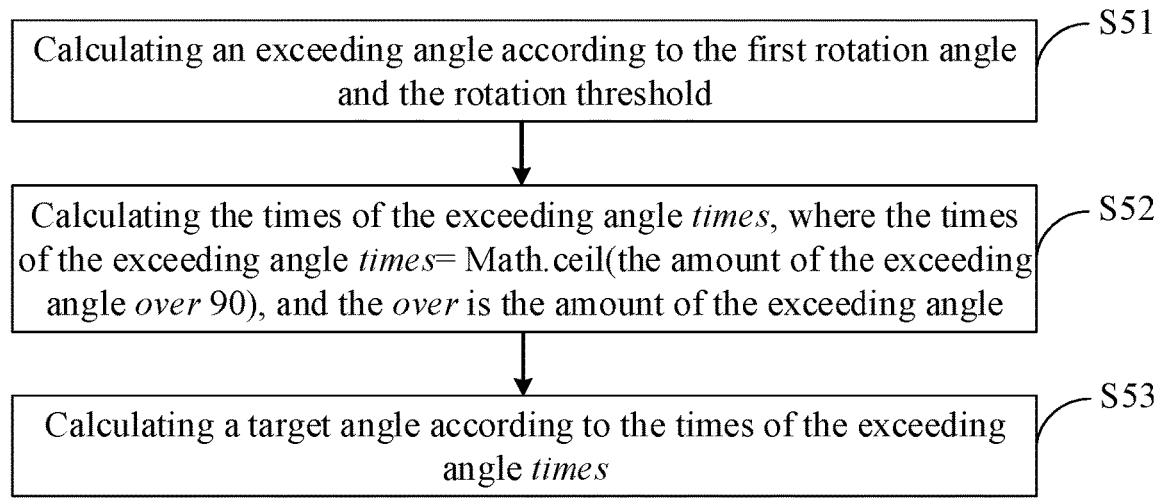
FIG. 12 is a flowchart showing a method for generating a target angle according to some embodiments.

There are many methods for generating the target angle. FIG. 12 is a flowchart showing a method for generating the target angle according to some embodiments, where the at least one processor is further configured to execute steps S51-S53.

Step S51: calculating an exceeding angle according to the first rotation angle and the rotation threshold.

The calculation process of the exceeding angle can be: the rotation angle delta=β−α, and the exceeding angle over=Math.max(|delta|, T)−T, where T is the rotation threshold.

For example, in some embodiments, the rotation threshold is 20, the initial angle α=30 degrees, the current angle β=60 degrees, delta=β−α=60−30=30 degrees (the first rotation angle is greater than the rotation threshold), and the amount of the exceeding angle=Math.max(30, 20) −20=10 degrees.

In some embodiments, the rotation threshold is 45, the initial angle α=30 degrees, the current angle β=60 degrees, delta=β−α=60−30=30 degrees (the first rotation angle is greater than the rotation threshold), and the mount of the exceeding angle over=Math.max(30, 45)−45=0 degree.

Step S52: calculating the times of the exceeding angle times, where the times of the exceeding angle times=Math.ceil(the amount of the exceeding angle over 90), and the over is the amount of the exceeding angle.

For example, in some embodiments, over=10 degrees, and times=Math.ceil(10/90)=1.

In some embodiments, over=0 degree, and times=Math.ceil(0/90)=0.

Step S53: calculating a target angle according to the times of the exceeding angle times.

The embodiments for how to calculate the target angle according to the times of the exceeding angle times may be: calculating the target angle to be finally rotated to, target=direction*times*90.

For example, in some embodiments, over=10 degrees, times=Math.ceil(10/90)=1; and target=1*90=90.

In some embodiments, over=0 degree, times=Math.ceil (0/90)=0, and target=0*90=0.

The calculating the target angle according to the times may also be: calculating the target angle to be finally rotated to, target=direction*times*90. If the rotation identifier is greater than or equal to 0, direction=1; if the rotation identifier is less than 0, direction=−1.

The rotation process of the image will be further described below in combination with specific examples.

Figure 13A:
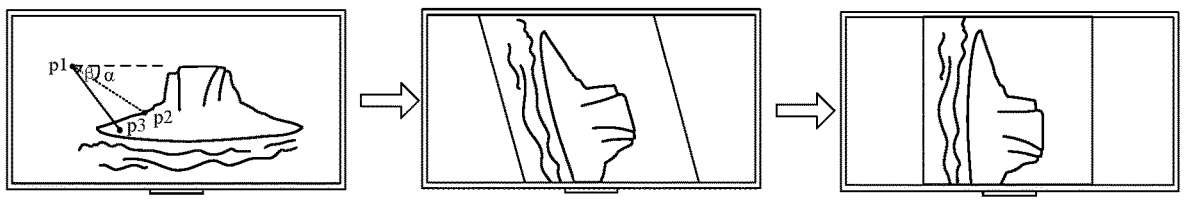
FIG. 13A is a schematic diagram showing a presentation interface of the display during image rotation according to some embodiments.

FIG. 13A is a schematic diagram showing a presentation interface of the display during image rotation according to some embodiments. In this embodiment, the initial angle α=30 degrees, and the current angle β=60 degrees. The at least one processor calculates the rotation angle as 30 degrees, and the at least one processor controls the image to rotate clockwise by 60 degrees. the user lifts the fingers off the display. In this embodiment, the rotation threshold is 20 degrees. In response to touching the display with less than two fingers of the user, the first rotation angle is greater than the rotation threshold. The at least one processor calculates times=Math.ceil((30−20)/90)=1, and then calculate the target angle=1*90. Therefore, in response to touching the display with less than two fingers of the user, the at least one processor controls the image to rotate by 90 degrees.

Figure 13B:
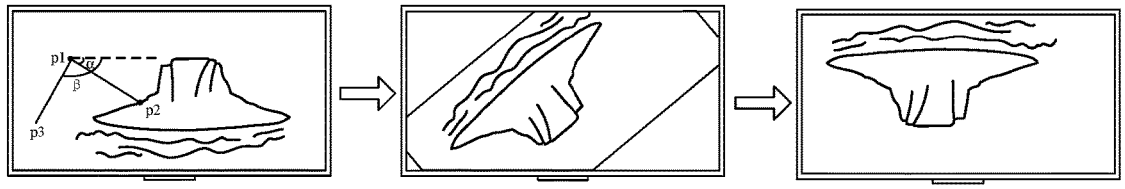
FIG. 13B is a schematic diagram showing a presentation interface of the display during image rotation according to some embodiments.

FIG. 13B is a schematic diagram showing a presentation interface of the display during image rotation according to some embodiments. In this embodiment, the initial angle α=30 degrees, and the current angle β=150 degrees. The at least one processor calculates the first rotation angle as 120 degrees, and the at least one processor controls the image to rotate clockwise by 120 degrees. At this time, the user lifts the fingers off the display. In this embodiment, the rotation threshold is 20 degrees. In response to touching the display with less than two fingers of the user, the rotation angle is greater than the rotation threshold. The at least one processor calculates times=Math.ceil((120−20)/90)=2, and then calculates the target angle=2*90. Therefore, in response to touching the display with less than two fingers of the user, the at least one processor controls the image to rotate by 180 degrees.

When the user's fingers are off the display, the image may also be presented in other forms. For example, in some embodiments, in response to touching the display with less than two fingers of the user, the at least one processor does not adjust the rotated image.

In the above-mentioned process of image rotation, the size of the image does not change, so the display can only present a part of the image when the rotation angle is not 0. Of course, in some other embodiments, the display ratio of the image may also be scaled accordingly based on the indicated rotation angle, so that the image can also be fully displayed on the display. The above two display manners are only for illustration.

Figure 14:
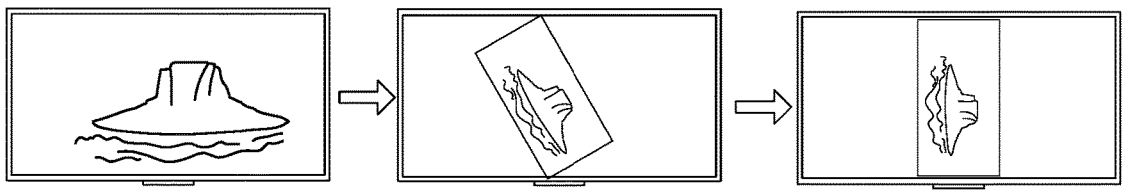
FIG. 14 is a presentation effect diagram of the display during image rotation.

Specifically, an embodiment of the disclosure shows a display apparatus. The at least one processor of the display apparatus can determine a scaling factor of the image according to the first rotation angle, so that the rotated image obtained each time can be fully presented on the display or presented in the display range of the display. The specific presentation effect can refer to FIG. 14, which is a presentation effect diagram of the display in the image rotation process.

The at least one processor may determine the scaling factor of the image according to the first rotation angle in many ways. For example, in some embodiments, the at least one processor may determine the scaling factor N of the image by the ratio of the diagonal of the image before and after the rotation to the diagonal of the image after the rotation.

Figure 15:
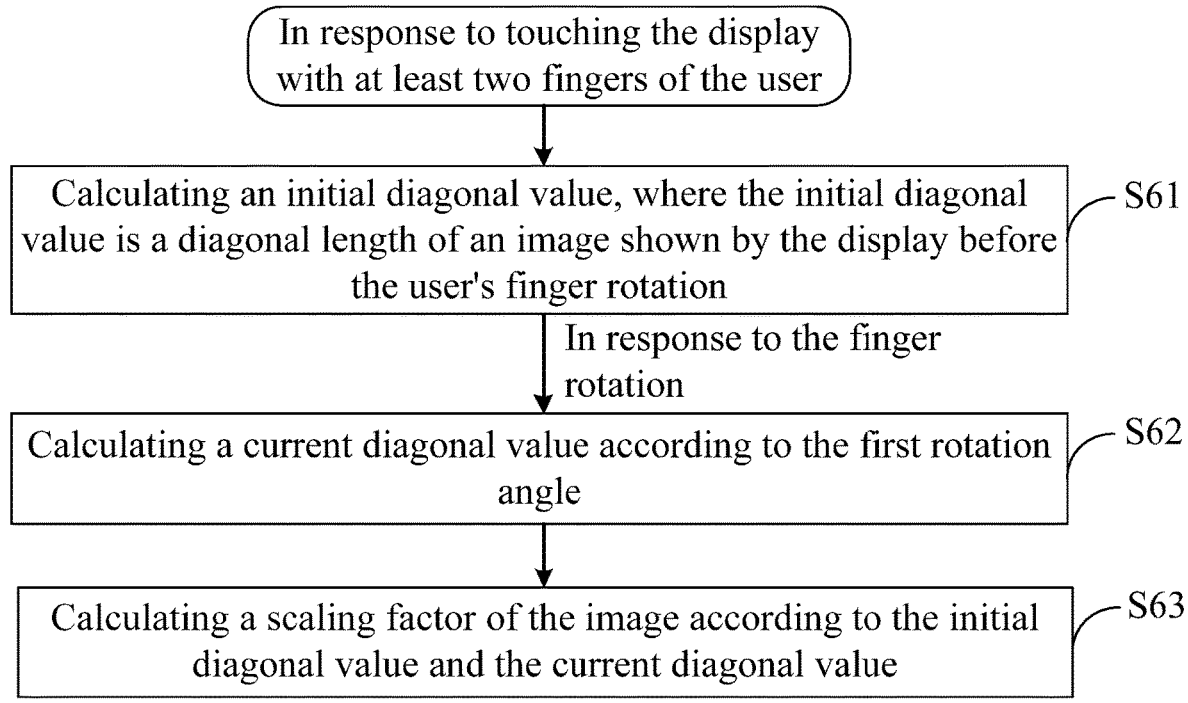
FIG. 15 is a flowchart showing a method for calculating a scaling factor according to some embodiments.

FIG. 15 is a flowchart showing a method for calculating a scaling factor according to some embodiments. The at least one processor is further configured to execute steps S61-S63.

In response to touching the display with at least two fingers of the user, calculating an initial diagonal value is performed (S61), where the initial diagonal value is a diagonal length of an image shown by the display before the user's finger rotation.

For example, the width and height of the image presented on the display before the user's finger rotation are w and h respectively. The initial diagonal value $d=(w^2+h^2)^{1/2}$.

In response to the finger rotation, calculating a current diagonal value according to the first rotation angle is performed (S62).

Figure 16:
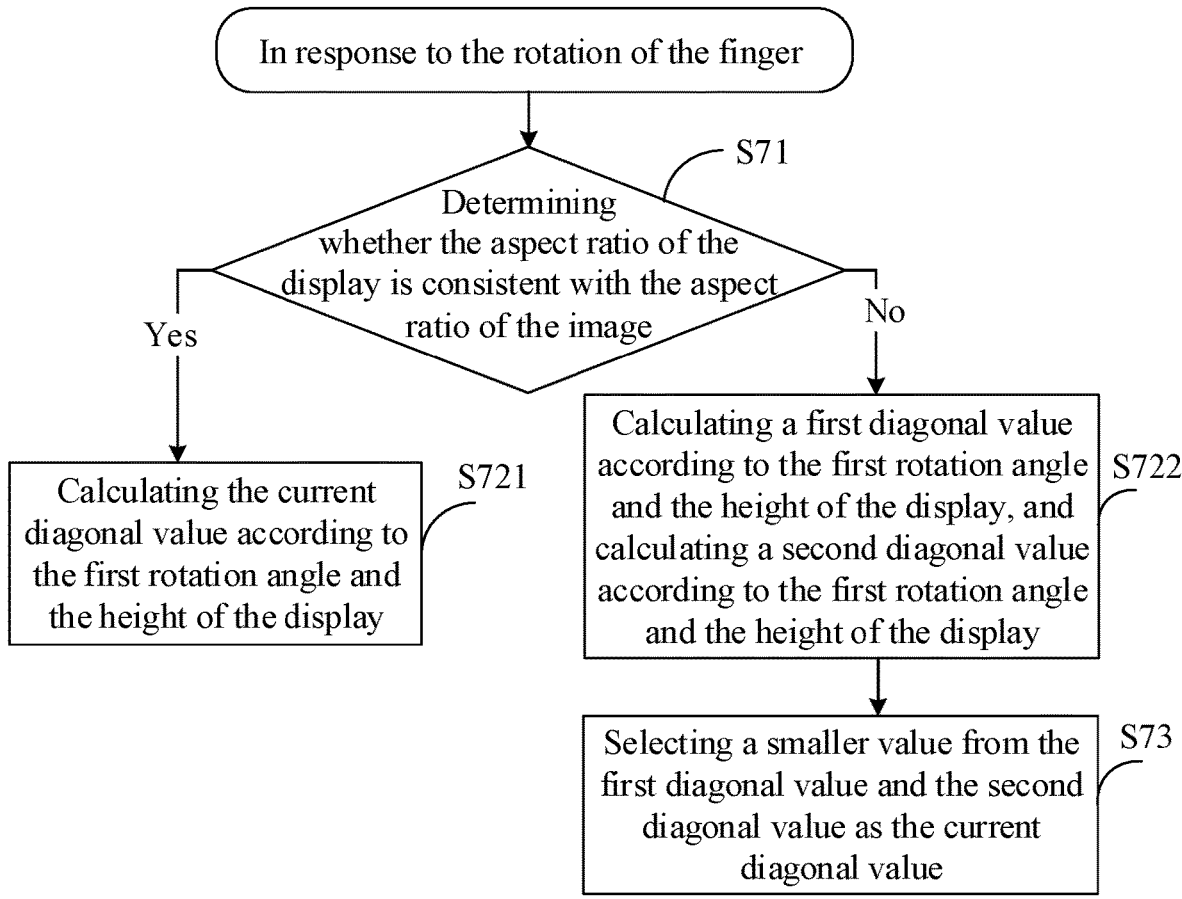
FIG. 16 is a flowchart showing a method for calculating a current diagonal according to some embodiments.

There are many ways to calculate the current diagonal value according to the first rotation angle. For example, FIG. 16 is a flowchart showing a method for calculating a current diagonal according to some embodiments, where the at least one processor is further configured to execute steps S71-S721/S73.

S71: determining whether the aspect ratio of the display is consistent with the aspect ratio of the image.

In some embodiments, the aspect ratio of the display and the aspect ratio of the image can be stored in advance. In some embodiments, the aspect ratio of the display can be calculated according to the width and height of the display, and the aspect ratio of the image can be calculated according to the width and height of the image.

The aspect ratio of the display is consistent with the aspect ratio of the image, and calculating the current diagonal value according to the first rotation angle and the height of the display is performed (step S721).

Figure 17A:
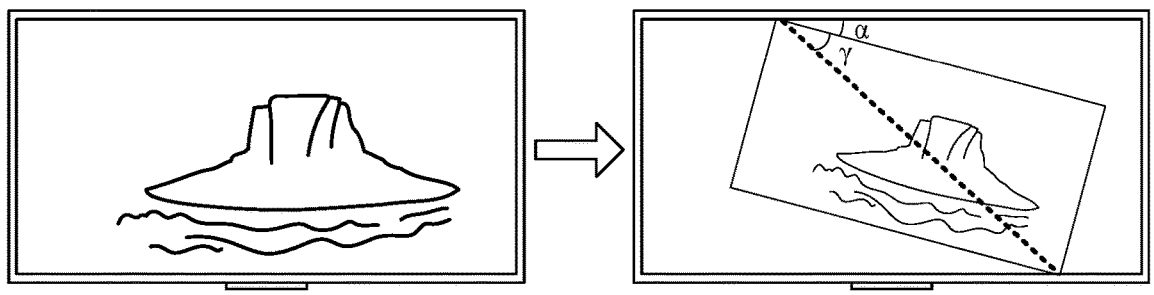
FIG. 17A is a schematic diagram showing a presentation interface of the display during image rotation according to some embodiments.

For example, FIG. 17A is a schematic diagram showing a presentation interface of the display during image rotation according to some embodiments. In this embodiment, the aspect ratio of the display is 16/9, and the aspect ratio of the image is 16/9; and the presentation effect of the image on the display can refer to the left image in FIG. 17A. The user controls the image to rotate by α by rotating the finger. The presentation effect of the rotated image on the display can refer to the right image in FIG. 17A. The angle between the width of the rotated image and the width of the display is α, and the angle between the diagonal line of the rotated image and the width of the image is γ. In this embodiment, when the first rotation angle is less than 90°, the current diagonal length can be obtained as d(α)=dh/sin(α+γ) according to the sine function; where γ=arc tan (h/w), where dh is the height of the display, h is the height of the image, and w is the width of the image.

Figure 17B:
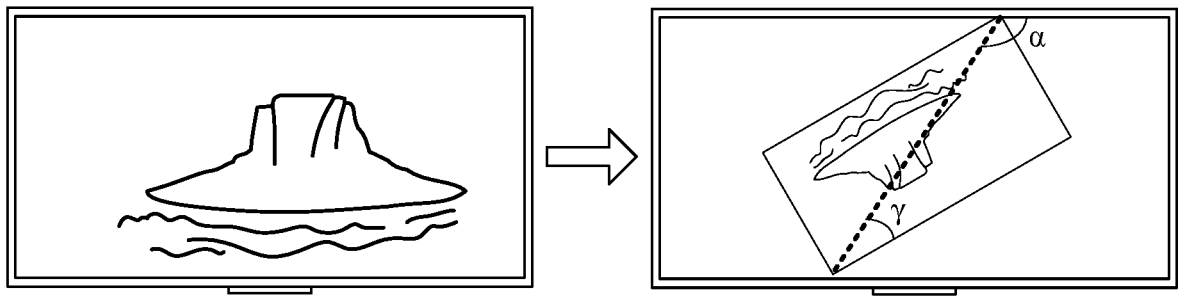
FIG. 17B is a schematic diagram showing a presentation interface of the display during image rotation according to some embodiments.

For example, FIG. 17B is a schematic diagram showing a presentation interface of the display during image rotation according to some embodiments. In this embodiment, the aspect ratio of the display is 16/9, and the aspect ratio of the image is 16/9; and the presentation effect of the image on the display can refer to the left image in FIG. 17B. The user controls the image to rotate by α by rotating the finger. The presentation effect of the rotated image on the display can refer to the right image in FIG. 17B. The angle between the width of the rotated image and the width of the display is α, and the angle between the diagonal line of the rotated image and the width of the image is γ. In this embodiment, when the first rotation angle is greater than 90°, the current diagonal length can be obtained as d(α)=dh/sin(α−γ) according to the sine function; where γ=arc tan (h/w), where dh is the height of the display, h is the height of the image, and w is the width of the image.

The aspect ratio of the display is inconsistent with or same as the aspect ratio of the image, and calculating a first diagonal value according to the first rotation angle and the height of the display and calculating a second diagonal value according to the first rotation angle and the height of the display is performed (step S722).

Step S73: selecting a smaller value from the first diagonal value and the second diagonal value as the current diagonal value.

Figure 18A:
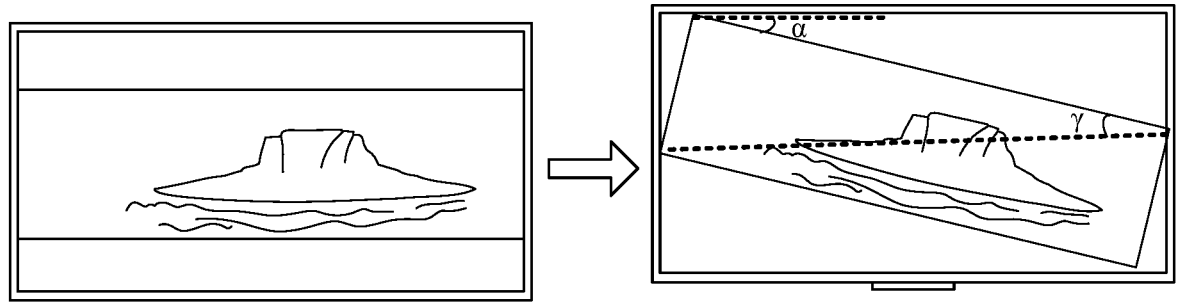
FIG. 18A is a schematic diagram showing a presentation interface of the display during image rotation according to some embodiments.

For example, FIG. 18A is a schematic diagram showing a presentation interface of the display during image rotation according to some embodiments. In this embodiment, the aspect ratio of the display is 16/9, and the aspect ratio of the image is 7/2; and the presentation effect of the image on the display can refer to the left image in FIG. 18A. The user controls the image to rotate by $\alpha$ ($\alpha$<90 degrees) by rotating the finger. The presentation effect of the rotated image on the display can refer to the right image in FIG. 18A. The angle between the width of the rotated image and the width of the display is $\alpha$, and the angle between the diagonal line of the rotated image and the width of the image is $\gamma$. In this embodiment, when the first rotation angle is less than 90°, the first diagonal value $d(\alpha)1=dh/\sin(\alpha+\gamma)$, and the second diagonal value $d(\alpha)2=dw/\sin(\alpha+\gamma)$; and in this embodiment, $d(\alpha)2$ is less than $d(\alpha)1$, so $d(\alpha)2$ is selected as the current diagonal value.

Figure 18B:
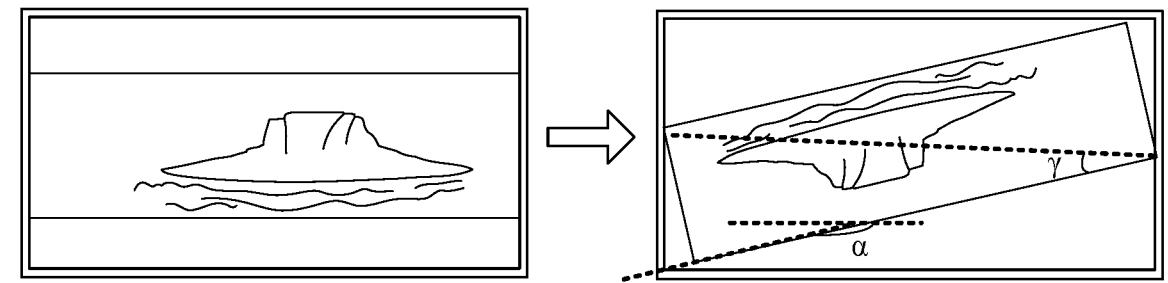
FIG. 18B is a schematic diagram showing a presentation interface of the display during image rotation according to some embodiments.

FIG. 18B is a schematic diagram showing a presentation interface of the display during image rotation according to some embodiments. In this embodiment, the aspect ratio of the display is 16/9, and the aspect ratio of the image is 7/2; and the presentation effect of the image on the display can refer to the left image in FIG. 18B. The user controls the image to rotate by $\alpha$ ($\alpha$>90 degrees) by rotating the finger. The presentation effect of the rotated image on the display can refer to the right image in FIG. 18B. The angle between the width of the rotated image and the width of the display is $\alpha$, and the angle between the diagonal line of the rotated image and the width of the image is $\gamma$. In this embodiment, when the first rotation angle is greater than 90°, the first diagonal value $d(\alpha)1=dh/\sin(\alpha-\gamma)$, and the second diagonal value $d(\alpha)2=dw/\sin(\alpha-\gamma)$; and in this embodiment, $d(\alpha)2$ is less than $d(\alpha)1$, so $d(\alpha)2$ is selected as the current diagonal value.

Figure 19A:
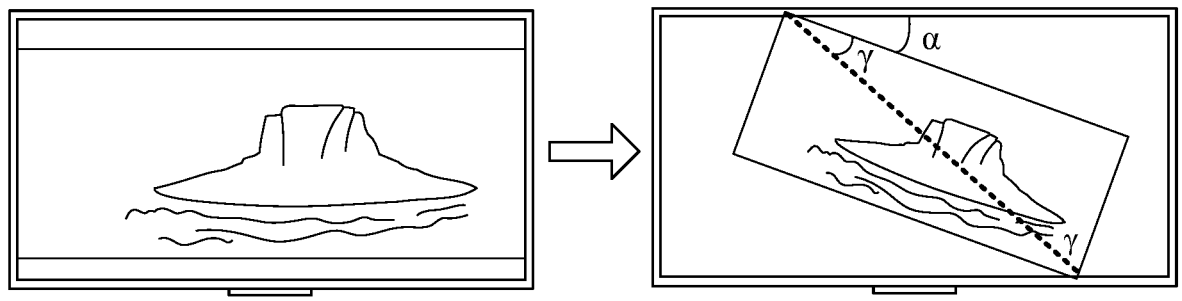
FIG. 19A is a schematic diagram showing a presentation interface of the display during image rotation according to some embodiments.

FIG. 19A is a schematic diagram showing a presentation interface of the display during image rotation according to some embodiments. In this embodiment, the aspect ratio of the display is 16/9, and the aspect ratio of the image is 2/1; and the presentation effect of the image on the display can refer to the left image in FIG. 19A. The user controls the image to rotate by $\alpha$ ($\alpha$<90 degrees) by rotating the finger. The presentation effect of the rotated image on the display can refer to the right image in FIG. 19A. The angle between the width of the rotated image and the width of the display is $\alpha$, and the angle between the diagonal line of the rotated image and the width of the image is $\gamma$. In this embodiment, when the first rotation angle is less than 90°, the first diagonal value $d(\alpha)1=dh/\sin(\alpha+\gamma)$, and the second diagonal value $d(\alpha)2=dw/\sin(\alpha+\gamma)$; and in this embodiment, $d(\alpha)1$ is less than $d(\alpha)2$, so $d(\alpha)1$ is selected as the current diagonal value.

Figure 19B:
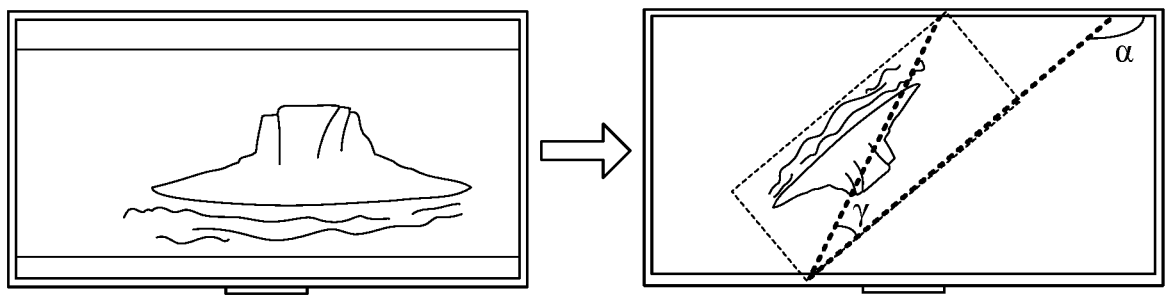
FIG. 19B is a schematic diagram showing a presentation interface of the display during image rotation according to some embodiments.

FIG. 19B is a schematic diagram showing a presentation interface of the display during image rotation according to some embodiments. In this embodiment, the aspect ratio of the display is 16/9, and the aspect ratio of the image is 2/1; and the presentation effect of the image on the display can refer to the left image in FIG. 19B. The user controls the image to rotate by $\alpha$ ($\alpha$>90 degrees) by rotating the finger.

The presentation effect of the rotated image on the display can refer to the right image in FIG. 19B. The angle between the width of the rotated image and the width of the display is $\alpha$, and the angle between the diagonal line of the rotated image and the width of the image is $\gamma$. In this embodiment, when the first rotation angle is greater than 90°, the first diagonal value $d(\alpha)1=dh/\sin(\alpha-\gamma)$, and the second diagonal value $d(\alpha)2=dw/\sin(\alpha-\gamma)$; and in this embodiment, $d(\alpha)1$ is less than $d(\alpha)2$, so $d(\alpha)1$ is selected as the current diagonal value.

Step S63: calculating a scaling factor of the image according to the initial diagonal value and the current diagonal value.

The scaling factor is scale=$d(\alpha)/d$.

In the display apparatus shown in the embodiments of the disclosure, the at least one processor of the display apparatus can determine the scaling factor of the image according to the first rotation angle, so that the rotated image obtained each time can be fully displayed on the display, and the user experience is better.

Figure 20:
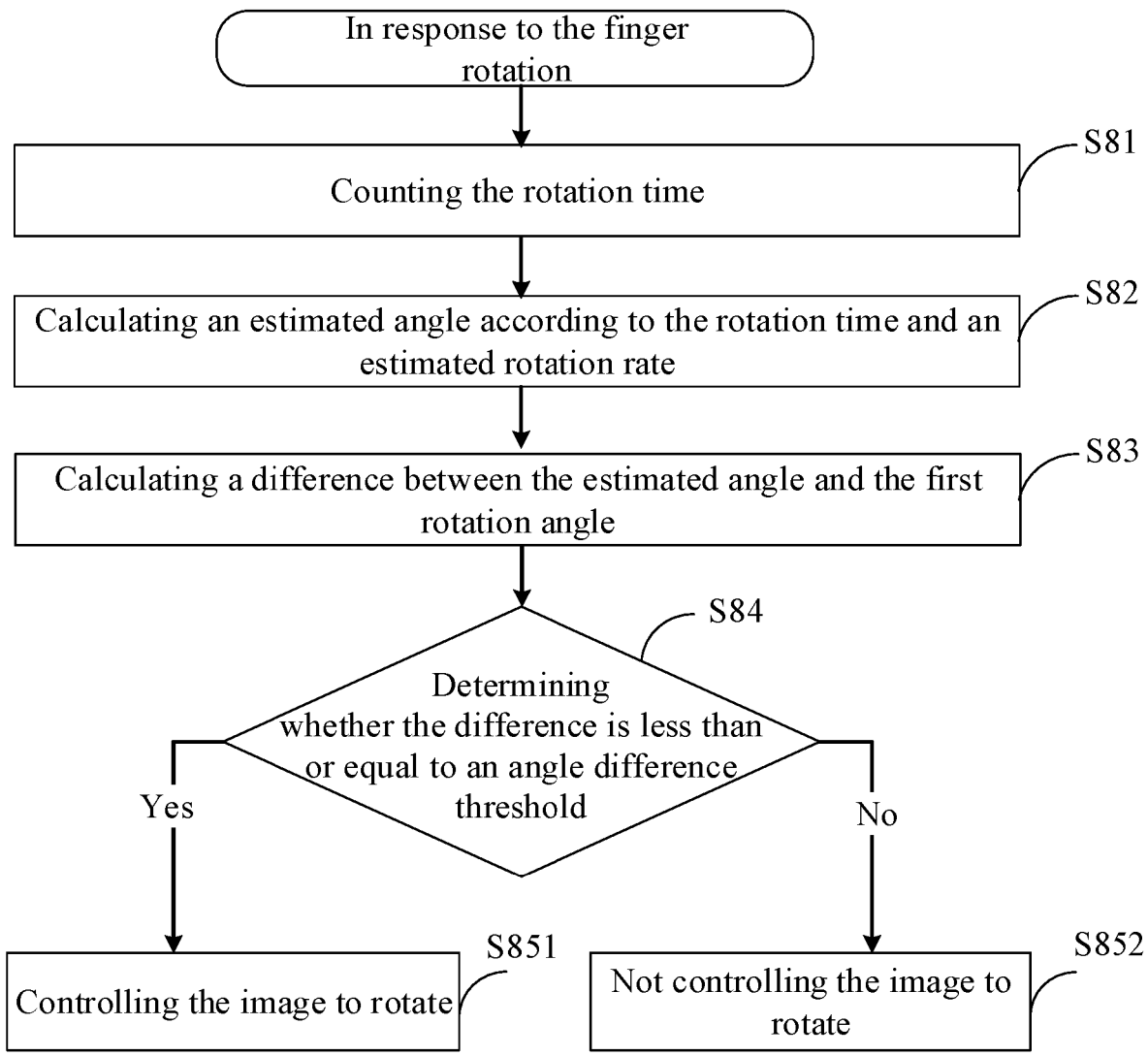
FIG. 20 is a flowchart showing an image stabilization method according to some embodiments.

In some scenarios, the rotated image presented on the display shakes during rotation due to shaking of the user's finger or other reasons, affecting the user's experience. In order to further improve the user's experience, this embodiment shows an image stabilization method, which can specifically refer to FIG. 20. FIG. 20 is a flowchart showing an image stabilization method according to some embodiments, where the at least one processor is further configured to execute steps S81-S851/S852.

In response to starting of the finger rotation, counting the rotation time is performed (S81).

S82: calculating an estimated angle according to the rotation time and an estimated rotation rate.

For example, in some embodiments, the rotation time is T, the first rotation angle is $\alpha$, and the estimated angle=$(\alpha/T)$*current time+initial angle.

S83: calculating a difference between the estimated angle and the first rotation angle; where the calculation method of the first rotation angle can refer to the above-mentioned embodiments.

S84: determining whether the difference is less than or equal to an angle difference threshold.

If the difference between the estimated angle and the first rotation angle is less than or equal to the angle difference threshold, controlling the image to rotate is performed so as to cause the first rotation angle to associate with the second rotation angle of the rotated image, where the second rotation angle is a rotation angle of the rotated image (step S851).

If the difference between the estimated angle and the first rotation angle is greater than the angle difference threshold, controlling the image to rotate is not performed (step S852).

In the embodiments, when the difference between the predicted angle and the first rotation angle is greater than the angle difference threshold, the image may be rotated due to the user's accidental operation. In this case, the at least one processor does not calculate the first rotation angle according to the initial angle and the current angle. The embodiments can reduce the data processing amount of the at least one processor on one hand, and avoid image shaking due to the user's accidental operation on the other hand, and the user experience is better.

In some other exemplary embodiments, when the display apparatus is equipped with the rotation component 276 and the touch component 277, the display can be rotated manually. The rotatable display apparatus is a new type of intelligent electronic device, which mainly includes a display and a rotation component, where the display is fixed on a wall or bracket through the rotation component, and the placement angle of the display can be adjusted through the rotation component to adapt to the display images with different aspect ratios. The user can display the horizontal media resource with an aspect ratio greater than 1 in the landscape state, or display the vertical media resource with an aspect ratio less than 1 in the portrait state. Of course, when the user clicks on a vertical media resource or enters a vertical application or inputs a rotation command, etc. in the landscape state, the rotatable display apparatus can be rotated from the landscape state to the portrait state, and vice versa.

For example, the display is placed horizontally in most cases, to display multimedia resources, such as movie, TV drama and other video images, with an aspect ratio of 16:9. When the video image is the multimedia resource, such as short video, comic or other image, with the aspect ratio of 9:16 the horizontally placed display needs to scale the image and display black areas on both sides of the display. Therefore, the display can be placed vertically by the rotation component to adapt to the video image with the ratio of 9:16.

For example, when the display is initially in the landscape display state and the user issues a command to rotate the display based on a gesture, the touch component receives the gesture command for rotation, and then the at least one processor controls the rotation component to rotate the display to the portrait state to achieve the effect of portrait display of the media resource.

In some cases, the gesture for rotating the display is the same as the gesture for rotating the image, both of which are touching with at least two fingers. When the user issues this rotation command, the display apparatus needs to give a target response by distinguishing the scenario and design. For example, the gesture is only supported to rotate the image but not supported to rotate the display in the image browsing interface. When the user outputs the rotation command, the image is rotated in response to the user's input. Of course, in this scenario, not all commands to rotate the display are disabled, and the commands to rotate the display can also be triggered by button or voice.

The embodiments of the disclosure further provide a display apparatus, including: a display; a rotation component configured to connect to the display and drive the display to rotate; a touch component configured to detect a touch track input from a user; a memory configured to store instructions and data associated with the display, at least one processor in connection with the display, the rotation component, the touch component and the memory and configured to execute the instructions to cause the display apparatus to: generate a first rotation angle based on a rotation gesture input from the user, where the first rotation angle is a rotation angle of the rotation gesture; determine that the rotation component does not have capability to drive the display to rotate, and then draw a rotated image according to the rotation angle, so that a second rotation angle is associated with the first rotation angle, where the second rotation angle is a rotation angle of the rotated image; and determine that the rotation component has the capability to drive the display to rotate, and control the rotation component to drive the display to rotate based on the rotation angle, so that a third rotation angle is associated with the first rotation angle, where the third rotation angle is a rotation angle of the display.

The embodiments for determining whether the rotation component has the capability to drive the display to rotate may discuss in the following.

For example, in order to prevent the rotation of the display apparatus caused by the user's accidental operation, a rotary switch can be set in the display apparatus. When the rotary switch is in on state, the at least one processor can control the rotation component to drive the display to rotate; when the rotary switch is in the off state, the at least one processor cannot control the rotation component to rotate. In some embodiments, if the rotary switch is in off state, the display is controlled to present the prompt information. In this embodiment, the prompt information is used to prompt the user that the rotary switch is in the off state.

For example, in an example, the at least one processor can read the state of the rotary switch; if the rotary switch is in off state, then the at least one processor controls the display to present the prompt information, which is used to prompt the user that the rotary switch is in off state; if the rotary switch is in on state, the at least one processor controls the rotation component to drive the display to rotate.

The display apparatus shown in the embodiments of the disclosure includes a display, a rotation component, a memory and at least one processor where the at least one processor is configured to execute instructions in the memory to cause the display apparatus to: generate a first rotation angle based on the rotation gesture formed by contacting the display with at least two fingers of the user and moving at least one finger; determine that the rotation component does not have a capability to drive the display to rotate, and then draw a rotated image according to the first rotation angle, so that a second rotation angle is associated with the first rotation angle, where the second rotation angle is a rotation angle of the rotated image; determine that the rotation component has the capability to drive the display to rotate, and control the rotation component to drive the display to rotate based on the rotation angle, so that a third rotation angle is associated with the first rotation angle, where the third rotation angle is a rotation angle of the display. In the disclosure, the rotation angle of the image generated by the at least one processor according to the rotation of the user's finger always matches with the user's rotated finger, the interaction between the user and the image is better, and the user experience is better.

The embodiments of the disclosure shows a display apparatus, including: a display; an external interface configured to connect to a rotation component to cause the rotation component to drive the display to rotate; a touch component configured to detect a touch track input from a user; a memory configured to store instructions and data associated with the display, at least one processor in connection with the display, the external interface, the touch component and the memory, and configured to execute instructions in the memory to cause the display apparatus to: generate a first rotation angle based on a rotation gesture input from the user, where the first rotation angle is a rotation angle of the rotation gesture; determine that the rotation component does not have a capability to drive the display to rotate, and then draw a rotated image according to the rotation angle, so that a second rotation angle is associated with the first rotation angle, where the second rotation angle is a rotation angle of the rotated image; and determine that the rotation component has the capability to drive the display to rotate, and control the rotation component to drive the display to rotate based on the rotation angle, so that a third rotation angle is associated with the first rotation angle, where the third rotation angle is a rotation angle of the display.

In an example, the at least one processor can read an identifier of the external interface that is used to connect to the rotation component; when the rotation component is inserted into the external interface, the identifier is a first identifier; when the rotation component is separated from the external interface, the identifier switches to a second identifier; if the identifier is the first identifier, it means that the rotation component has established a connection with the at least one processor, and in this case, the at least one processor is able to control the rotation component to drive the display to rotate. If the identifier is the second identifier, the at least one processor controls the display to display the prompt information; and in this embodiment, the prompt information is used to prompt the user that the rotation component is not inserted into the external interface.

For the convenience of explanation, the above description has been made in combination with specific embodiments. However, the above exemplary discussions are not intended to be exhaustive or to limit implementations to the specific forms disclosed above. Numerous modifications and variations can be obtained in light of the above teachings. The above embodiments are chosen and described in order to better explain the principles and practical applications, so as to enable those skilled in the art to better utilize the described embodiments and various variant embodiments suitable for specific use considerations.

What is claimed is:

1. A display apparatus, comprising:
   a display, configured to display an image and/or user interface;
   a touch component, configured to detect a touch track input from a user;
   a memory, configured to store data associated with the display and computer instructions;
   at least one processor in connection with the display, the touch component and the memory and configured to execute the computer instructions to cause the display apparatus to:
      generate a first rotation angle based on a rotation gesture formed by contacting the display with at least two fingers of the user and moving at least one finger, wherein the first rotation angle is a rotation angle of the rotation gesture;
      upon receiving the rotation gesture formed by contacting the display, obtain an aspect ratio of the display and, an aspect ratio and an initial diagonal value of an image initially displayed on the display;
      draw a rotated image according to the first rotation angle of the rotation gesture, to cause the first rotation angle to associate with a second rotation angle of the rotated image, wherein at least one processor is further configured to cause the display apparatus to:
      calculate a current diagonal value according to:
         the first rotation angle of the rotation gesture,
         an angle between a diagonal line and a width line of the rotated image, and
         a height of the display, or a width and the height of the display, based on a comparison between the aspect ratios of the display and the image; and
      according to the initial diagonal value and the current diagonal value, calculate a scaling factor for reducing or enlarging the image; and
      control the display to present the rotated image.

2. The display apparatus according to claim 1, wherein the initial diagonal value is a diagonal length of an image displayed by the display before user's finger rotation.

3. The display apparatus according to claim 1, wherein the at least one processor is further configured to execute the computer instructions to cause the display apparatus to:
   in response to the aspect ratio of the display being consistent with the aspect ratio of the image, calculate the current diagonal value according to the first rotation angle, the angle between the diagonal line and the width line of the rotated image, and the height of the display;
   in response to the aspect ratio of the display being not consistent with the aspect ratio of the image,
      calculate a first diagonal value according to the first rotation angle, the angle between the diagonal line and the width line of the rotated image, and the height of the display, and
      calculate a second diagonal value according to the first rotation angle, the angle between the diagonal line and the width line of the rotated image, and the width of the display; and
   select a smaller value from the first diagonal value and the second diagonal value as the current diagonal value.

4. The display apparatus according to claim 1, wherein the at least one processor is further configured to execute the computer instructions to cause the display apparatus to:
   while the display is presenting the image, in response to touching the display with at least two fingers of the user, calculate an initial angle, wherein the initial angle is an included angle between a connecting line between two fingers before user's finger rotation and a preset reference line;
   in response to a finger rotation, calculate a current angle, wherein the current angle is an included angle between a connecting line between two fingers during user's finger rotation and the preset reference line; and
   calculate the first rotation angle according to the initial angle and the current angle.

5. The display apparatus according to claim 1, wherein the at least one processor is further configured to execute the computer instructions to cause the display apparatus to:
   while the display is presenting the image, in response to touching the display with at least two fingers of the user, obtain an initial reference line, wherein the initial reference line is a connecting line between the two fingers before user's finger rotation;
   in response to a finger rotation, obtain a current reference line, wherein the current reference line is a connecting line between two fingers during user's finger rotation; and
   calculate the first rotation angle according to the initial reference line and the current reference line.

6. The display apparatus according to claim 1, wherein the at least one processor is further configured to execute the computer instructions to cause the display apparatus to:
   generate a rotation identifier according to the first rotation angle and a rotation angle absolute value which is an absolute value of the first rotation angle;
   in response to the rotation identifier being greater than 0, cause the image to rotate clockwise by the first rotation angle; and
   in response to the rotation identifier being less than 0, cause the image to rotate counterclockwise by the first rotation angle.

7. The display apparatus according to claim 4, wherein the at least one processor is further configured to execute the computer instructions to cause the display apparatus to:
   in response to starting of the user's finger rotation, count rotation time of the user's finger rotation;

calculate an estimated angle according to the rotation time and an estimated rotation rate;

in response to a difference between the estimated angle and the current angle being greater than an angle difference threshold, not calculate the first rotation angle, wherein the first rotation angle is a rotation angle generated based on a rotation gesture formed by contacting the display with at least two fingers of the user and moving at least one finger; and in response to the difference between the estimated angle and the current angle being less than or equal to the angle difference threshold, calculate the first rotation angle according to the initial angle and the current angle.

8. The display apparatus according to claim 1, wherein at least two opposite vertices of the rotated image are always within a display range of a display screen, and the rotated image does not exceed the display range of the display screen, and the at least two opposite vertices of the rotated image are two ends of the diagonal line of the rotated image.

9. A display method for a display apparatus, comprising:

generating a first rotation angle based on a rotation gesture formed by contacting a display with at least two fingers of a user and moving at least one finger, wherein the first rotation angle is a rotation angle of the rotation gesture;

upon receiving the rotation gesture formed by contacting the display, obtaining an aspect ratio of the display and, an aspect ratio and an initial diagonal value of an image initially displayed on the display;

drawing a rotated image according to the first rotation angle of the rotation gesture, to cause the first rotation angle to associate with a second rotation angle of the rotated image, wherein a process of drawing the rotated image comprises:

calculating a current diagonal value according to the first rotation angle of the rotation gesture, an angle between a diagonal line and a width line of the rotated image, and a height of the display, or a width and the height of the display, based on a comparison between the aspect ratios of the display and the image; and according to the initial diagonal value and the current diagonal value, calculating a scaling factor for reducing or enlarging the image; and controlling the display to present the rotated image.

10. The display method according to claim 9, wherein the initial diagonal value is a diagonal length of an image displayed by the display before user's finger rotation.

11. The display method according to claim 9, wherein calculating the current diagonal value further comprises:

in response to the aspect ratio of the display being consistent with the aspect ratio of the image, calculating the current diagonal value according to the first rotation angle, the angle between the diagonal line and the width line of the rotated image, and the height of the display;

in response to the aspect ratio of the display being not consistent with the aspect ratio of the image, calculating a first diagonal value according to the first rotation angle, the angle between the diagonal line and the width line of the rotated image, and the height of the display, and calculating a second diagonal value according to the first rotation angle, the angle between the diagonal line and the width line of the rotated image, and the width of the display; and selecting a smaller value from the first diagonal value and the second diagonal value as the current diagonal value.

12. The display method according to claim 9, further comprising:

while the display is presenting the image, in response to touching the display with at least two fingers of the user, calculating an initial angle, wherein the initial angle is an included angle between a connecting line between two fingers before user's finger rotation and a preset reference line;

in response to a finger rotation, calculating a current angle, wherein the current angle is an included angle between a connecting line between two fingers during user's finger rotation and the preset reference line; and calculating the first rotation angle according to the initial angle and the current angle.

13. The display method according to claim 9, further comprising:

while the display is presenting the image, in response to touching the display with at least two fingers of the user, obtaining an initial reference line, wherein the initial reference line is a connecting line between the two fingers before user's finger rotation;

in response to a finger rotation, obtaining a current reference line, wherein the current reference line is a connecting line between two fingers during user's finger rotation; and calculating the first rotation angle according to the initial reference line and the current reference line.

14. The display method according to claim 9, further comprising:

generating a rotation identifier according to the first rotation angle and a rotation angle absolute value which is an absolute value of the first rotation angle;

in response to the rotation identifier being greater than 0, causing the image to rotate clockwise by the first rotation angle; and in response to the rotation identifier being less than 0, causing the image to rotate counterclockwise by the first rotation angle.

15. The display method according to claim 12, further comprising:

in response to starting of the user's finger rotation, counting rotation time of the user's finger rotation;

calculating an estimated angle according to the rotation time and an estimated rotation rate;

in response to a difference between the estimated angle and the current angle being greater than an angle difference threshold, not calculating the first rotation angle, wherein the first rotation angle is a rotation angle generated based on a rotation gesture formed by contacting the display with at least two fingers of the user and moving at least one finger; and in response to the difference between the estimated angle and the current angle being less than or equal to the angle difference threshold, calculating the first rotation angle according to the initial angle and the current angle.

16. The display method according to claim 9, wherein
- at least two opposite vertices of the rotated image are always within a display range of a display screen, and the rotated image does not exceed the display range of the display screen, and
- the at least two opposite vertices of the rotated image are two ends of the diagonal line of the rotated image.

\* \* \* \* \*